United States Patent [19]

Bacon et al.

[11] 4,269,914

[45] May 26, 1981

[54] ULTRASONOGRAPHIC ELEMENTS CONTAINING MULTIPLE LAYERS AND PROCESSES FOR THEIR USE

[75] Inventors: Robert E. Bacon, Rochester; Ronald G. Raleigh, Brockport; Robert B. Rosenfeld, Rochester, all of N.Y.

[73] Assignee: Eastman Kodak Company, Rochester, N.Y.

[21] Appl. No.: 30,665

[22] Filed: Apr. 16, 1979

[51] Int. Cl.$^3$ .......................... G03C 1/76; G03C 5/26
[52] U.S. Cl. ........................................ 430/3; 430/495; 430/496; 430/505; 430/570; 430/606
[58] Field of Search ................... 430/606, 3, 505, 495, 430/496, 570

[56] References Cited

U.S. PATENT DOCUMENTS

| | | | |
|---|---|---|---|
| 2,857,273 | 10/1958 | Landow | 430/606 |
| 3,523,022 | 8/1970 | Byerley et al. | 430/606 |
| 3,579,333 | 5/1971 | Land et al. | 430/606 |
| 3,765,403 | 10/1973 | Brendon | 128/2 V |
| 3,854,953 | 12/1974 | Shiba et al. | 430/606 |
| 3,867,149 | 2/1975 | Furuya et al. | 430/606 |
| 4,082,553 | 4/1978 | Groet | 430/505 |

OTHER PUBLICATIONS

P. J. Ernst, "Ultrasonography," *Journal of the Acoustical Society of America*, vol. 22, No. 1, pp. 80-83, Jan. 1951.
M. E. Arkhangel'skii, "Action of Ultrasound on the Processes of Photographic Development and Fixing," *Soviet Physics–Acoustics*, vol. 12, No. 3, pp. 241-248.

*Primary Examiner*—Mary F. Downey
*Attorney, Agent, or Firm*—Carl O. Thomas

[57] ABSTRACT

An ultrasonographic element is disclosed comprised of first and second layers coated on a support, at least one of the layers being a silver halide emulsion layer. One of the layers contains a diffusible ion capable of altering the sensitivity of a silver halide emulsion while the other layer is capable of immobilizing the diffusible ion. Interposed between the layers is a barrier for impeding diffusion of the sensitivity altering ion in the absence of ultrasound. An ultrasonographic image is formed by contacting the element with a transport liquid, ultrasonically exposing the element imagewise to accelerate diffusion of the sensitivity altering ion between the layers, exposing the element to electromagnetic radiation and photographically processing the element to produce an image corresponding to the image pattern of ultrasonic exposure.

16 Claims, 2 Drawing Figures

ULTRASONOGRAPHIC ELEMENTS CONTAINING MULTIPLE LAYERS AND PROCESSES FOR THEIR USE

FIELD OF THE INVENTION

This invention relates to an improvement in ultrasonography. More specifically, this invention relates to novel ultrasonographic elements containing silver halide emulsion layers and to processes of producing ultrasonographic images employing these elements.

BACKGROUND OF THE INVENTION

The term "ultrasonic radiation" is employed in this specification to designate pressure-rarefaction waves differing from sound waves in exhibiting higher frequencies and shorter wavelengths. The term "ultrasonic exposure" is employed to designate exposure to ultrasonic radiation. The production of visible images by means of ultrasonic radiation is referred to as "ultrasonoscopy". The production of a visible record by means of ultrasonic radiation is referred to as "ultrasonography". The instruments for producing ultrasonoscopic images are designated "ultrasonoscopes", and the ultrasonoscopes which produce ultrasonographic images are referred to as "sonographic cameras". The definition of terms as here presented is believed to be generally consistent with the use of these terms in the art. Specifically, these terms are suggested by P. J. Ernst in the *Journal of the Accoustical Society of America*, Vol. 22, No. 1, in an article entitled "Ultrasonography", pp. 80–83, January 1951.

The prior state of the art with respect to the action of ultrasound on silver halide photographic elements is reviewed by M. E. Arkhangel'skii, *Soviet Physics-Acoustics*, Vol. 12, No. 3, "Action of Ultrasound on the Processes of Photographic Development and Fixing", pp. 241-248, January-March 1967. The ability of ultrasound exposure to produce a latent image in silver halide emulsions has been recognized since the 1930's. However, power level requirements to achieve ultrasonic imaging have been quite high, and there have been controversies as to whether the ultrasound directly produces the latent image or stimulates other effects, such as cavitation-stimulated luminesence, which produces the latent image. It has been a difficulty in the art that ultrasonic exposure requirements of silver halide photographic elements, even with the most responsive techniques known to Arkhangel'skii, have remained unattractively high. For example, such techniques have required intensity and time levels of ultrasonic exposure which are objectionable to many non-destructive testing applications, such as mammographic examination with ultrasound as described by Brendon U.S. Pat. No. 3,765,403.

Rosenfeld U.S. Ser. No. 854,556, filed Nov. 25, 1977, titled *AN IMPROVEMENT IN ULTRASONOGRAPHY*, now abandoned in favor of copending U.S. Ser. No. 031,083, filed Apr. 18, 1979, now U.S. Pat. No. 4,223,082 is directed to an improved process of ultrasonic imaging in which a visible ultrasonic image is formed in a silver halide element by imagewise exposing the element to ultrasonic radiation, thereby altering its photographic response, and concurrently or subsequently exposing the silver halide element to electromagnetic radiation to form a developable latent image. The element is then photographically processed to produce a visible image corresponding to the latent image. In an ultrasonographically negative-working form Rosenfeld brings into contact with a transport liquid an element containing a silver halide emulsion layer which is initially desensitized to light by the presence of an incorporated diffusible ion. The element is imagewise exposed to ultrasound. This has the effect of locally sensitizing the emulsion to light, so that upon light exposure and photographic processing a maximum density is produced in areas of the element which are ultrasonically exposed. In an ultrasonographically positive-working form the silver halide emulsion is initially sensitive to light and is brought into contact with a transport liquid containing diffusible ions capable of desensitizing the emulsion to light. Imagewise ultrasonic exposure results in local desensitization of the emulsion to light, so that light exposure followed by photographic processing produces a minimum density in areas of the element which are ultrasonically exposed. In one variant form both a polar solvent and a diffusible densensitizing ion are initially incorporated within the silver halide emulsion. In other variant forms the diffusible ion has the effect of sensitizing the silver halide emulsion. The disclosure of Rosenfeld is here incorporated by reference.

SUMMARY OF THE INVENTION

This invention represents an improvement on the teachings of Rosenfeld, cited above. In producing an ultrasonographic image employing an element containing a silver halide emulsion layer it has been discovered that both an enhancement is sensitivity to ultrasound and an improvement in image discrimination (maximum density minus minimum density) can be achieved by providing an element containing a layer which acts as a source of diffusible ions capable of altering the sensitivity of a silver halide emulsion to electromagnetic radiation and another layer which acts as a sink or receiver for these diffusible ions. A barrier is interposed between the layers to impede diffusion of the ions between the layers in the absence of ultrasound. Either the layer which is the source or the layer which is the receiver for the diffusible ions can comprise a silver halide emulsion.

In one aspect then, this invention is directed to an ultrasonographic element comprising a support and, coated on the support, (a) a first layer containing diffusible ions capable of altering the sensitivity of a silver halide emulsion to electromagnetic radiation, (b) a second layer capable of immobilizing the diffusible ions and (c) barrier means interposed between the first and second layers for impeding diffusion of the sensitivity altering ions in the absence of ultrasound. At least one of the first and second layers comprises a silver halide emulsion.

This invention is also directed to a process of producing an ultrasonographic image employing the ultrasonographic element described immediately above. The element is contacted with a transport liquid and exposed to ultrasound in an image pattern to accelerate diffusion of the sensitivity altering ions between the first and second layers through the barrier means. Exposing the element to electromagnetic radiation and photographically processing the element produces an image corresponding to the image pattern of ultrasonic exposure.

This invention can be better appreciated by reference to the following detailed description considered in conjunction with the drawings, in which FIG. 1 is a schematic diagram of an ultrasonographic system according to this invention and FIG. 2 is a plot of log ultrasonic exposure versus density.

DESCRIPTION OF THE PREFERRED EMBODIMENTS

Figure 1:
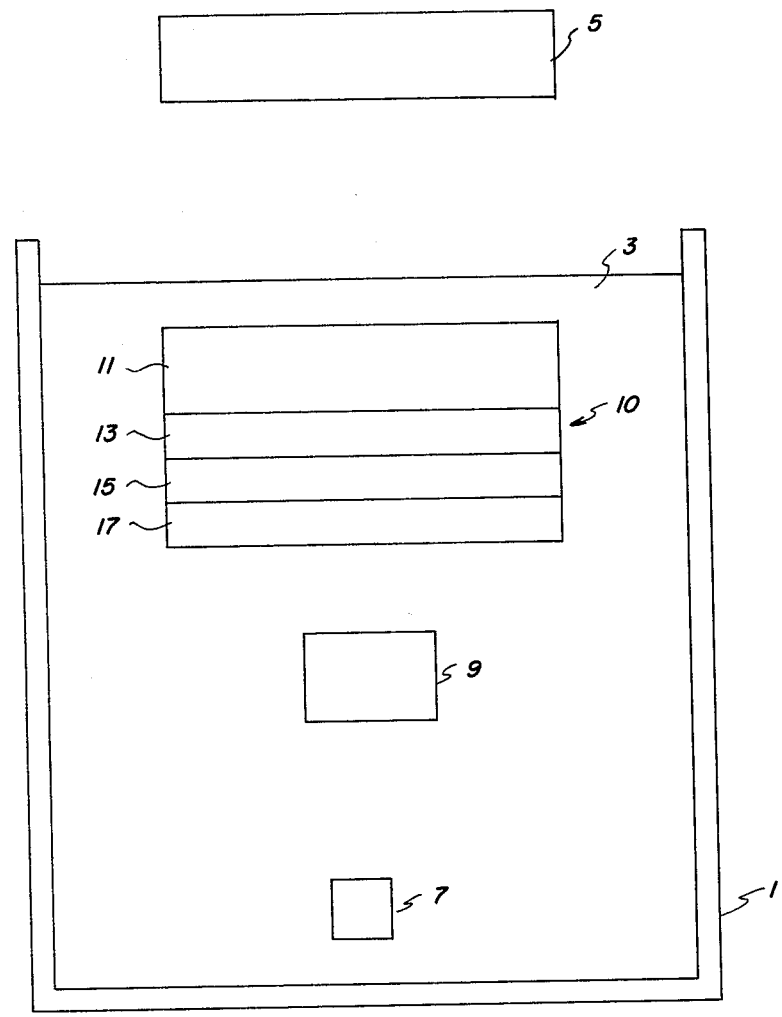

A system for practicing this invention is schematically illustrated in FIG. 1. A vessel 1 contains a bath 3 comprised of a transport liquid. Positioned above the bath is an electromagnetic radiation source 5—e.g., a lamp. (For ease of description electromagnetic radiation is hereafter discussed by reference to light.) Contained within the bath is an ultrasonic transducer 7. Also immersed in the bath and spaced from the ultrasonic transducer is an object 9. An ultrasonographic element 10 according to this invention is immersed in the bath so that it is spaced from the object and the object is interposed between the ultrasonic transducer and the ultrasonographic element.

In imaging, the ultrasonographic element 10 is immersed in the bath 3 in the position indicated immediately before or, preferably, for a short duration before, the transducer 7 ultrasonically irradiates the element. The ultrasonic radiation is propagated between the transducer and the element by the transport liquid contained in the bath 3. The object 9 interposed between the transducer and the element modulates the ultrasound so that a nonuniform or image pattern of ultrasound impinges on the element. Where the element is ultrasonographically negative-working, light exposure of the element from the source 5 can occur concurrently with exposure to ultrasound. But, in any case, source 5 can light expose the element following ultrasonic exposure. Preferably the light exposure of the element is delayed briefly following ultrasonic exposure. Conventional photographic processing is thereafter employed to produce a visible image which corresponds to the image pattern of ultrasonic exposure. With the exception of the details of the ultrasonographic element 10 the system and its use is described in detail in Rosenfeld U.S. Ser. No. 854,556, cited and incorporated by reference above.

The ultrasonographic element 10 as schematically illustrated is formed by a support 11 having coated thereon three layers 13, 15 and 17. Layer 15 is a barrier layer which impedes diffusion of ions between the layers 13 and 17 to a much greater extent in the absence of ultrasound than when ultrasonically exposed. One of the layers 13 and 17 is a source layer initially containing diffusible ions capable of altering the sensitivity of a silver halide emulsion while the remaining of the layers is a receiving layer acting as a sink or receiver for the diffusible ions. At least one of the layers 13 and 17 comprises a silver halide emulsion.

In a specific preferred form the ultrasonographic element 10 is negative-working-that is, it is intiallly relatively desensitized to light and is rendered more light responsive in ultrasonically exposed areas. The layer 17 is a source layer. It is a silver halide emulsion layer which contains diffusible ions capable of desensitizing the emulsion to light. The layer 13 is a receiving layer for the diffusible ions. The layer 15 is a barrier layer.

When the element is immersed in the bath and imagewise ultrasonically exposed, the diffusible ions which are initially desensitizing the silver halide emulsion layer in part diffuse into the transport liquid. A portion of the diffusible ions also enter the barrier layer, since their rate of diffusion in the barrier material is greatly accelerated by ultrasound. However, since the diffusion paths of the ions is essentially random, in the absence of the receiving layer 13, the diffusible ions are free, not only to enter the barrier layer, but also to return.

Rosenfeld prior to this invention demonstrated the diffusion of desensitizing ions from a silver halide emulsion layer of a negative-working ultrasonographic element into a reservoir containing a transport liquid. Also prior to this invention Rosenfeld demonstrated that the additional presence of a hydrophilic colloid layer underlying the emulsion layer can enhance image discrimination, although he observed no increase in sensitivity attributable to the presence of the hydrophilic colloid undercoat. It is believed that Rosenfeld's success was limited by his failure to provide a receiving layer.

In the practice of this invention the presence of the receiving layer can have the effect of increasing both the image discrimination and the ultrasonic sensitivity of the ultrasonographic element. The diffusible desensitizing ions leaving the emulsion layer penetrate the barrier layer and thereby come into contact with the receiving layer. Upon contact with the receiving layer the ions are immobilized. Thus, they are not free to continue their random migration in the presence of ultrasound, which otherwise results in a portion of the ions migrating back to the emulsion layer. It is believed that the enhanced response of the ultrasonographic elements of this invention in this preferred form can be attributed to the contribution of the receiving layer in depleting the desensitizing ions initially within the emulsion layer.

In a second specific preferred form the ultrasonographic element 10 is ultrasonographically positive-working—that is, initially light-sensitive and rendered relatively light insensitive in ultrasonically exposed areas. The layer 17 comprises an initially light-sensitive silver halide emulsion and is in this form a receiving layer. The layer 13 is in this form a source layer initially containing diffusible desensitizing ions. The layer 15 is again a barrier layer. The bath in this instance contains in addition to the transport liquid diffusible desensitizing ions.

When the ultrasonographic element is immersed in the bath and imagewise ultrasonically exposed, diffusion of desensitizing ions from the bath into the silver halide emulsion layer is accelerated in ultrasonically exposed areas. It should be noted, however, that the emulsion layer 17 has two major surfaces—an outer major surface which is in contact with the bath and an inner major surface which is in contact with the barrier layer. As a result of providing desensitizing ions from the source layer 13 the emulson layer 17 receives desensitizing ions in ultrasonically exposed areas through both of its major surfaces. Thus, the effective area of the emulsion layer 17 available for receipt of desensitizing ions is doubled as compared with an element lacking a source layer. When the ultrasonographic element is subsequently light exposed and photographically processed, the higher incidence of desensitizing ions in the ultrasonically exposed areas results in reduced silver halide development in these areas.

The foregoing discussion has illustrated ultrasonographically positive- and negative-working systems which rely on the ultrasound induced migration of diffusible desensitizing ions for imaging. Both positiveand negative-working systems are contemplated which employ diffusible sensitizing ions.

In a third specific preferred form the ultrasonographic element 10 is ultrasonographically negative-working. The layer 17 comprises an initially relatively light-insensitive silver halide emulsion. The layer 13 is a source layer containing diffusible ions capable of sensitizing the emulsion layer to light. The layer 15 is again a barrier layer, essentially as described above. The bath 3 contains sensitizing ions in addition to the transport liquid.

When the ultrasonographic element is immersed in the bath and imagewise ultrasonically exposed, diffusion of sensitizing ions into the silver halide emulsion layer is accelerated in ultrasonically exposed areas. The effect of the source layer is to provide an additional source of sensitizing ions. The increase in light sensitivity of the emulsion layer in ultrasonically exposed areas is, of course, related to the receipt of sensitizing ions. Light exposure and photographic processing result in more silver halide being developed in areas receiving light sensitizing ions.

In a fourth specific preferred form the ultrasonographic element 10 is ultrasonographically positive-working. The layer 17 comprises an initially light-sensitive silver halide emulsion. The layer 13 is a receiving layer for diffusible ions initially contained in the silver halide emulsion layer which have a sensitizing effect on the emulsion layer. The layer 15 is again a barrier layer, essentially as described above. The bath 3 contains the transport liquid and need contain no diffusible ions.

When the ultrasonographic element is immersed in the bath and imagewise ultrasonically exposed, diffusion of sensitizing ions out of the emulsion layer into the bath occurs. Additionally a portion of the sensitizing ions also diffuse to the receiving layer. That is, in ultrasonically exposed areas sensitizing ion diffusion occurs from both major surfaces of the emulsion layer with limited back-diffusion. Reduced sensitizing ion in the ultrasonically exposed areas of the emulsion layer results in reduced light sensitivity, and photographic processing results in less silver halide development in ultrasonically exposed areas.

In each of the four specific forms of the invention described above the layer 17 of the ultrasonographic element 10 comprises a silver halide emulsion. It is specifically contemplated that the layers 13 and 17 in each of the forms discussed above can be interchanged in position or—alternately viewed—the layer 13 can comprise a silver halide emulsion while the layer 17 acts as a source or receiving layer for the emulsion layer. In the ordinary case in which the support is liquid impermeable this has the effect of rendering one major surface of the emulsion layer unavailable for sensitivity altering ion diffusion. These inverted layer arrangements then are not, in general, of the same order of sensitivity as the four arrangements discussed above, other features being comparable. It should be noted that FIG. 1 is a schematic diagram which, for ease of illustration, grossly exaggerates the layer thicknesses as compared with their areas. Drawn to scale, the edge areas are negligible as compared with the major surface areas of the element. Therefore the transport liquid must enter the element exclusively through layer 17. Accordingly, it is not essential that diffusible ions initially be present in the bath when the inverted layer arrangements are employed, since they can be supplied entirely by layer 17.

In the foregoing discussion of the layers 13 and 17 one layer is a silver halide emulsion layer while the remaining layer is a source or receiving layer which supplies diffusible ions to or receives diffusible ions from the emulsion layer so that the light sensitivity of the emulsion layer is altered. It is specifically contemplated that the remaining layer can also be a silver halide emulsion layer, and that an image can be concurrently formed in both layers. For example, in one specifically contemplated form the ultrasonographic element 10 is negative-working and both layers 13 and 17 are silver halide emulsion layers. The two emulsions are preferably chosen so that the ultrasonically induced migration of a diffusible ion from one emulsion layer has the effect of sensitizing it to light while receipt of the diffusible ion by the second emulsion has the effect of sensitizing it as well. The two layers thus form a source and receiving layer pair. Either the source or receiving layer can be the outermost layer of the element. The bath 3 can be relied upon to either supply diffusible ions to or receive diffusible ions from the outermost layer to enhance its response to ultrasonic exposure. For purposes of subsequent reference this exemplary form of the invention is referred to as the fifth specific form of the invention.

In the foregoing discussion details of later forms which are identical to or obvious from previously discussed forms have been elided in the interest of brevity. For the purpose of providing an initial overview of the invention the foregoing discussion has been directly to certain illustrative forms and has omitted a detailed discussion of the specific chamical approaches which can be employed for implementation. Chemical approaches and variant forms are discussed in detail below. It is intended that the discussion be read and construed as a whole.

THE TRANSPORT LIQUID

In the illustrative form of the invention shown in FIG. 1 the element 10 is immersed in a transport liquid. The transport liquid performs two distinct functions. First, the transport liquid acts as a medium for the transmission of ultrasound. It is generally recognized that liquids transmit ultrasonic energy more efficiently (that is, with less attenuation) than gaseous media. Second, the transport liquid serves as a medium in which the ions capable of altering the sensitivity of the silver halide emulsion can diffuse.

In a simple form, such as that illustrated, a single transport liquid can be employed to form both functions. In an alternative form the ultrasonic transducer can be contacted with one transport liquid and a second transport liquid can be in contact with the ultrasonographic element, with an ultrasonically transmitting partition, such as a membrane, separating the two transport media. In this instance only the transport liquid actually contacting the ultrasonographic element need possess the ability to act as a diffusion medium for the sensitivity altering ions. In still another form the transport liquid which acts as an ionic diffusion medium can be coated on the layer 17 or entirely ingested within the ultrasonographic element. The element with the first transport liquid coated or ingested can then be immersed in the second transport liquid or brought into contact with an ultrasonically transmitting partition separating the two transport liquids.

Water is a preferred transport liquid. Being a polar solvent water is particularly well suited for providing an ionic diffusion medium. Other polar solvents can be employed in lieu of or in combination with water, if desired. Exemplary useful polar solvents in addition to water include water-miscible alcohols, ketones and amides (e.g., acetone, phenol, ethyl alcohol, methyl alcohol, isopropyl alcohol, ethylene glycol, N,N-dimethylacetamide and methyl ethyl ketone), tetrahydrofuran, N-methyl-2-pyrrolidone, dimethylsulfoxide and mixtures of the above, with or without water. Where a second transport liquid is employed which is not required to provide a diffusion medium for diffusible ions, either the polar solvents described above or nonpolar liquids, such as liquid alkanes (e.g., heptane, octane, nonane, etc.), liquid cycloalkanes (e.g., cyclohexane) and benzene, can be employed. Where the second transport liquid is separated from the first by a partition, it is apparent that any liquid can be employed as the second transport liquid, and where the second transport liquid is in contact with the first transport liquid, it is merely necessary that the two transport liquids be relatively immiscible and chemically compatible. In view of the criteria provided above it is apparent that the selection of a particular transport liquid or combination of transport liquids is within the ordinary skill of the art.

In choosing among otherwise comparable transport liquids, whether they directly contact the silver halide emulsion layer to be exposed or are remote or external, consideration can be given to the ultrasonic absorption coefficient of the transport liquid. Water at an ultrasonic frequency of 5 megahertz and at a temperature of 20° C. has an ultrasonic absorption coefficient of $6 \times 10^{-3}$ cm$^{-1}$. The ultrasonic absorption coefficients for liquids range from about two orders of magnitude higher than that of water to about two orders of magnitude lower than that of water. The advantage to be achieved by a low ultrasonic absorption coefficient is reduced dissipation of ultrasonic energy in the transport liquid. Lower ultrasonic abosrption coefficients are particularly preferred for the transport liquids external to the photographic element or remote from the silver halide emulsion layer. It is believed that higher ultrasonic absorption coefficients for transport liquids which contact the silver halide emulsion layers can contribute to improving their response to ultrasound.

Ultrasonic absorption coefficients of transport liquids can be ascertained by reference to published values. For example, values are published by Kinsler and Frey, *Fundamentals of Acoustics,* Wiley, N.Y., 1950; Hueter and Bolt, *Sonics,* Wiley, N.Y., 1955; and Herzfeld and Litovitz, *Absorption and Dispersion of Ultrasound Waves,* Academic Press, N.Y., 1959.

ULTRASONIC EXPOSURE

FIG. 1 illustrates a simple sonographic camera for exposing the ultrasonographic element 10 to ultrasound transmitted from the transducer 7 and modulated in transit by the object 9. It is also possible to locate the ultrasonographic element so that it receives ultrasound reflected by the object 9. In a more sophisticated form the sonographic camera can include combinations of sonic lenses and reflectors for focusing and directing the ultrasonic radiation. For example, the ultrasonoscope of Brendon, cited above, can be readily adapted for use as a sonic camera in the practice of this invention merely by locating the ultrasonographic element in one of the water tanks so that it is impinged by the ultrasonic radiation which has passed through or been reflected by the mamma under examination. The sonographic cameras disclosed by Rosenfeld, cited and incorporated by reference above, can also be employed.

After contact with the transport liquid, the ultrasonographic element is ultrasonically exposed before alteration of its photosensitivity attributable to contact with the transport liquid has been completed. Except where rapid alteration of the photosensitivity as a function of contact with the transport liquid prohibits, it is usually preferred to allow the ultrasonographic element at least a few seconds, preferably at least about 10 seconds, of contact with the transport liquid before initiating ultrasonic exposure. Delaying ultrasonic exposure after initial contact with the transport liquid can be used to enhance the ultrasonographic response. The optimum delay period for a particular element can be correlated to the transport liquid contact period at which incipient alteration of the photosensitivity of the element is observed. For some elements alteration of photosensitivity begins immediately upon association with the transport liquid, and there is no advantage to delaying the ultrasonic exposure. Where the ultrasonographic element is of a type that requires ultrasonic energy to initiate change in photosensitivy, the time period that elapses between contact of the ultrasonographic element with the transport liquid and ultrasonic exposure in most instances exhibits significantly reduced, if any, effect on ultrasonic response.

Some ultrasonograhic elements, such as those having photographic film supports, directly absorb only a very small fraction of the total ultrasonic radiation to which they are exposed, the rest passing directly through the element. Accordingly, it is possible during ultrasonic exposure to orient a film support element so that either the emulsion layer bearing surface or the film support surface of the ultrasonographic element is nearest to the ultrasonic radiation source. Also, one or a plurality of imaging emulsion layers can be coated on either or both major surfaces of the film support and concurrently exposed. Further, it is possible to stack two or more film support elements so that ultrasonic radiation passes through them sequentially during exposure. Of course, where precise focusing of the ultrasonic radiation is desired, the number of film support elements which will produce optimum images may be limited. By way of contrast, ultrasonographic elements with paper supports absorb almost all of the ultrasonic imaging radiation to which they are exposed. For ultrasonographic elements having paper supports the silver halide emulsion layer must be on the side nearest to the source of the ultrasonic radiation source. Generally better image quality is obtained in all instances where the emulsion layer is on the face of the support nearest the ultrasonic energy source.

Imagewise exposure of the ultrasonographic element in the sonographic camera is preferably at an intensity and for a duration which is insufficient to produce a developable image in the absence of light being externally directed on the ultrasonographic element. At these low levels of ultrasonic radiation no cavitation stimulated luminescence is generated that might produce a latent image in the ultrasonographic element. The level of ultrasonic exposure is further lower than that which has been recognized in the art to produce ultrasonic images in the absence of light. That is, the ultrasonic imaging exposure is itself insufficient to produce a latent image in the emulsion layer of the ultrasonographic element being exposed. This means simply that, in the absence of exposure to light, subsequent photographic processing of the ultrasonically exposed emulsion layer under the specific development and other conventional processing conditions chosen will not produce a visible image. Successful imaging can be achieved at ultrasonic exposures below 100 watt-sec./cm$^2$ by this process.

Just as different photographic elements exhibit marked differences in their sensitivity to electromagnetic exposure, different ultrasonic elements also exhibit different sensitivities to ultrasonic radiation. By exposing ultrasonographic elements to differing ultrasonic intensities and then performing the light exposure and photographic processing steps, the optimum ultrasonic exposure for a given ultrasonographic element can be readily determined. In a manner analogous to light sensitometry using a step tablet, it is possible to expose an ultrasonographic element simultaneously in lateral areas with an array of laterally spaced ultrasonic transducers which are calibrated to transmit ultrasonic radiation at predetermined stepped levels of intensity. Upon subsequent light exposure and photographic processing, densities produced by each transducer can be plotted against ultrasonic exposure. This generates an ultrasonic characteristic curve for the particular ultrasonographic element from which the optimum intensity of ultrasonic exposure can be readily determined.

The determination can be repeated using differing durations of ultrasonic exposure, if desired, although this is not usually necessary. In using photographic cameras varied shutter speeds (exposure times) and f-stop settings (exposure intensities) are available to the photographer to achieve a given exposure, since exposure is recognized to be the mathematical product of exposure time and intensity. The proposition that equal photographic exposures differing in intensity and duration produce similar photochemical response is referred to as the photographic reciprocity law, and this law is generally relied upon in photography in varying exposure times and intensities, although it is recognized that many photographic elements exhibit significant reciprocity law failure. By analogy to photography, various combinations of ultrasonic exposures as a mathematical product can be relied upon in a general way in accordance with a reciprocity law of ultrasonic exposure which is analogous to the photographic reciprocity law.

However, Rosenfeld has recognized that his process produces a significant ultrasonic exposure reciprocity law departure which can be put to favorable use. Specifically, Rosenfeld has observed that at equal exposures differing in intensity and duration the ultrasonographic speeds observed progressively increase as a function of the shortening of the exposure duration. Viewed another way, by using shorter durations of ultrasonic exposure, less than expected increases in intensity are required to achieve a particular ultrasonographic speed. This is particularly advantageous, since many objects which might be ultrasonographically examined are limited in both the intensity and duration of the ultrasonic radiation which they can withstand safely without risk of degradation. Generally the longer the duration of exposure above a threshold minimum level of intensity the lower the intensity must be to avoid degradation. The favorable ultrasonic exposure reciprocity law departure observed by Rosenfeld is also applicable to this process and allows the use of lower than the expected intensities with decreased duration of exposure, thereby avoiding degradation without sacrificing ultrasonographic speed.

Any ultrasonic frequency heretofore employed in ultrasonography can be applied to the practice of this process. For a given transmission medium the wavelength of the ultrasonic radiation is reciprocally related to its frequency. Since best imaging results in ultrasonography and ultrasonoscopy are recognized to be obtainable when the wavelength of the ultrasonic imaging radiation is substantially shorter than the dimension of the object or object feature to be imaged, it is generally preferred to operate at shorter wavelengths and hence higher frequencies. For example, at a frequency of 1 megahertz ultrasonic radiation transmitted in water exhibits a wavelength in the order of 1.5 millimeters. Accordingly in obtaining ultrasonographs of objects or object features of about 1.5 millimeters in dimension it is preferred to operate substantially above 1 megahertz, typically in the range of 2.5 to 100 megahertz. Frequencies in the order of gigahertz are known in the art and can be employed, particularly when microscopic image definition is required. The high operating frequencies are, of course, advantageous since they effectively define both large and small objects and object features, although increased absorptivity of many materials at higher frequencies requires thinner object samples. In the prior art ultrasonic exposures of photographic elements have most typically occurred at lower frequencies in order to stimulate cavitation. This process is not similarly limited.

The ultrasonic exposure of the ultrasonographic element can be constant in intensity for the duration of exposure or it can be varied in intensity. An increase in response for a given ultrasonographic element can be achieved if the ultrasonic exposure is pulsed. Pulsing of the ultrasonic exposure can be achieved by continuously modulating the intensity of exposure or, preferably, interrupting ultrasonic exposure so that ultrasonic exposure is divided into separate bursts or discrete pulses. It is preferred to employ discrete pulses wherein the duration of the pulses and the interval therebetween is less than a tenth of a second. The response of the ultrasonographic element can be increased further by employing higher frequencies of pulsing. The duration of the ultrasonic pulse and the interval between pulses can be varied independently, if desired. For example, useful results can be obtained with pulse durations of 1 microsecond separated by pauses of 1 millisecond. The minimum useful pulse and interval durations are limited only by the capabilities of the ultrasonic emitters selected for use. Naturally, as the pulses and intervals between pulses approach the frequency of the ultrasonic radiation, continuous exposure will be approached as a limit.

ELECTROMAGNETIC EXPOSURE

It is preferred to employ visible light during electromagnetic radiation exposure, and, as noted above, the description of electromagnetic radiation exposure is discussed in terms of light exposure. However, it is to be appreciated that the utility of this invention is not limited to use with any particular portion of the electromagnetic spectrum, but can employ electromagnetic radiation of any wavelength heretofore known to be useful in photography, including ultraviolet and visible light, as well as infrared radiation, unless otherwise specifically qualified below.

In using an ultrasonographically negative-working element it is only necessary that the light exposure strike those areas of the ultrasonographic element that are ultrasonically exposed. In other words, a light image which is a duplicate or approximation of the image-wise ultrasonic exposure can be employed. It is usually more convenient to exposure in a nonimagewise manner (e.g., uniformly) the ultrasonographic element to light so that registration of the two exposures is not required. For ultrasonographically negative-working elements light exposure can usefully occur at any stage following the onset of ultrasonic modification of the ultrasonographic element—i.e., either during or after ultrasonic exposure. Since the ultrasonographically negative-working elements are initially relatively light-insensitive, light exposure of the ultrasonographic element before ultrasonic exposure can be tolerated, but it has no useful effect in forming the ultrasonographic image.

In using an ultrasonographically positive-working photographic element which is initially sensitive to light exposure and becomes less responsive as a result of ultrasonic exposure, light exposure is required in those areas which are not initially imagewise ultrasonically exposed, and, as a practical matter, nonimagewise light exposure is generally most convenient. Since light exposure before ultrasonic desensitization in image areas has occurred will have a fogging action on the ultrasonographic element, it is generally preferred to avoid light exposure before or during ultrasonic exposure. Light exposure is deferred until after ultrasonic imagewise desensitization of the ultrasonographic element has been accomplished. This, however, does not preclude light exposure while ultrasonic exposure is still occurring.

When ultrasonic and light exposures are concurrently undertaken, or at least undertaken in overlapping time periods, it is necessary to light expose the photographic element while it is still in contact with the transport liquid. For example, if the ultrasonographic element is immersed in a transport liquid or other liquid transmission medium during ultrasonic exposure, light exposure can also be undertaken through this medium. Conveniently the ultrasonic transport media are most commonly substantially transparent (specularly transmissive to light over at least a portion of the visible spectrum). Where ultrasonic and light exposures are undertaken consecutively, it is possible to remove the ultrasonographic element from the environment of ultrasonic exposure—e.g., contact with the transport liquid—before light exposure is undertaken. However, it is preferred to light expose the ultrasonographic element after ultrasonic exposure without moving the element with respect to the transport liquid and thus risking degradation of image definition. Where a plurality of ultrasonographic elements are stacked for ultrasonic exposure, it is preferred to move the ultrasonographic elements before light exposure to insure uniform exposure.

According to a preferred technique for practicing this process, ultrasonic and light exposures are consecutive, rather than concurrent or overlapping. A significant increase in the imaging sensitivity of the ultrasonographic element occurs if light exposure follows ultrasonic exposure. Specifically, significant enhancement in density differences between ultrasonically exposed and background areas are observed when light exposure is delayed from about 10 to 200 seconds (optimally from about 15 to 50 seconds) following ultrasonic exposure at ordinary room temperatures (20° to 25° C.). This enhancement of the ultrasonographic image is attributed to a furtherance during the delay period of the alterations of the ultrasonographic element initiated by ultrasonic exposure. As indicated above, it is preferred not to disturb the ultrasonographic element between ultrasonic and light exposure.

For ultrasonographically positive-working elements a series of exposures, with different samples or using a step tablet, can be made under the conditions of actual use to identify optimum levels of electromagnetic radiation exposure. For example, the minimum level of light which produces a maximum density as well as the maximum level of light which produces a minimum density can be determined as well as exposures which produce intermediate density levels under the contemplated conditions of photographic processing. It is preferred to employ a light exposure in excess of that required to produce a maximum density in subsequent processing. However, low levels of light exposure which produce a density at least 0.1 above the minimum density (preferably 0.5 above minimum density) can be employed.

For ultrasonographically negative-working elements, optimum levels of light can be ascertained by contacting an element with the transport liquid to be placed in contact with it during ultrasonic and light exposure and then variably light exposing the element, using different samples or a step tablet, after 10 hours of immersion or any shorter time interval at which the ultrasonically negative-working element has approached its maximum light sensitivity. It is preferred to employ a light exposure in excess of that required to produce a maximum density in subsequent processing. However, lower levels of light exposure which produce a density as little as 0.1 above the minimum density (preferably 0.5 above the minimum density) can be employed.

In determining the optimum levels of light exposure as described above, the ultrasonographic elements are photographically processed in accordance with the techniques to be employed in our process. Once usable light exposure levels have been identified, intensity and duration of light exposure can be varied in accordance with the photographic reciprocity law.

It is recognized in photography that the integrated sum of intermittent light exposures can produce a higher density than a corresponding continuous light exposure when the average intensity of exposure is less than the intensity (referred to herein as the transition intensity) at the nadir of a plot of log continuous exposure versus log intensity (referred to in the art as a reciprocity curve) for a photographic element. The density difference observed is referred to in the art as an intermittency effect. It is known in the art that the effect of increasing the frequency of intermittent light exposures at an average intensity level below the transition intensity, holding the integrated sum of the exposures constant, causes the densities obtained to increase until a critical frequency is reached. Above the critical frequency no further increase in density occurs.

Rosenfeld discovered that an unexpected increase in image discrimination can be achieved by employing pulsed—that is, varied intensity, preferably intermittent, light exposures. This effect can be achieved employing uniform light exposures of both high and low density rendering areas of the ultrasonographic elements in direct contrast with the necessarily differential (e.g., imagewise) light exposures of high and low density areas in obtaining photographic intermittency effects. Specifically, it has been observed that maximum obtainable densities can be increased significantly by uniform, intermittent light exposures of ultrasonographic elements without the same increases in minimum densities occurring. In considering pulsed light exposure, such variants as synchronizing the pulsed light exposure with the ultrasound exposure and also varying the frequency of light pulsing are contemplated. Since the speed of light is much faster than the rate of pressure-rarefaction wave propagation, synchronized delay of light pulses are contemplated so that each light pulse reaches the element being exposed concurrently with or following after a time delay each ultrasound pulse. The duration of the delay of the light pulses with respect to the ultrasound pulses can be chosen to take optimum advantage of the chemical or physical alteration set in motion by the preceding ultrasound pulse or pulses. The light pulsing techniques of Rosenfeld are considered fully applicable to this invention.

As is well understood by those skilled in the art of photography, if silver halide emulsion imaging layers are given progressively greater exposures substantially in excess of those required to produce a maximum density, the densities produced typically plateau at the maximum density and then decline, in many instances, to approach the initial minimum density level (or less) at very high levels of exposure. This photographic effect is referred to in the art as solarization. Solarization is occasionally used in photography to reverse the sense of a photographic image. For example, solarization will produce a positive image using a normally negative-working photographic element.

Unlike conventional photography, the ultrasonographic images obtained with this process exhibit no reversal of the sense of the ultrasonographic image when operating at high levels of exposure approaching solarization. Accordingly, the maximum light exposures which are employed in the practice of this process can be at any level below that which will completely solarize the photographic element; that is, produce a density no higher than the background density in the absence of light exposure. It is contemplated to employ maximum light exposures which produce a density of at least 0.1 (preferably at least 0.5) above that produced by the solarization exposure.

PHOTOGRAPHIC PROCESSING

Once ultrasonic and light exposures of the ultrasonographic element have occurred, a selectively developable latent image has been formed in the exposed silver halide emulsion layer or layers of the element. The latent image can be subsequently converted to a visible image employing solutions and procedures which are conventionally employed in photographic processing. The term "photographic processing" is employed in its art recognized sense as designating those processing steps conventionally employed in photography to form a visible image corresponding to a latent image contained in a silver halide emulsion layer of a photographic element. Photographic processing useful in the practice of this process is disclosed, for example, in *Research Disclosure*, Vol. 176, December 1978, publication 17643, paragraph XIX, Processing, here incorporated by reference. *Research Disclosure* and *Product Licensing Index* are published by Industrial Opportunities Ltd., Homewell, Havant, Hampshire, P09, 1EF, United Kingdom.

A preferred photographic processing technique is to develop the latent image to a visible silver image. This can be accomplished merely by contacting the exposed silver halide emulsion layer with a photographic developer. It is preferred that other conventional photographic processing steps be employed as well, such as rinsing, fixing and stopping.

Another preferred photographic processing technique is to convert the latent image to a visible dye image. This can be accomplished following procedures which are well appreciated by those skilled in color photography. According to one technique, a dye image can be formed concurrently with developing the latent image to a silver image. Sufficient silver need not be developed to be visible. The silver image developed, since it need not be relied upon for visibility, can be bleached. By techniques well known in color photography, it is also possible to form a color reversal image. It is also recognized that a color image can be produced by altering the mobility of a dye-image-former, such as a dye-developer or redox dye-releaser, and transferring the mobile dye to a conventional receiver for viewing. In still another conventional approach to forming a color image, a redox amplification reaction between an oxidizing agent, such as transition metal complex (e.g., cobalt(III) hexammine) or a peroxide (e.g., hydrogen peroxide), and a dye-image-generating reducing agent, such as a color developing agent or an electron transfer agent employed in combination with dye-image-former (e.g., a dye-developer or redox dye-releaser) can be catalyzed by either the latent image or a silver image developed from it. The oxidizing agent and the dye-image-generating reducing agent are chosen to be substantially inert to oxidation-reduction reaction in the absence of a catalyst. Conventional redox dye image amplification techniques are disclosed in U.S. Pat. Nos. 3,765,891, 3,822,129, 3,834,907, 3,841,873, 3,847,619, 3,862,842, 3,923,511, 3,902,905 and 3,674,490.

Since photographic developer compositions are polar solvent solutions, such as aqueous alkaline solutions, it is recognized that a developer composition can be associated with the ultrasonographic element before or during ultrasonographic exposure. Since the ultrasonic exposure is insufficient to generate a developable latent image in the ultrasonographic element in and of itself, no development of the element occurs during or after ultrasonic exposure unless or until accompanied by light exposure. This is in direct contrast to previously reported experiments in which development has occurred immediately upon higher levels of ultrasonic exposure. As an alternative to placing the developer composition in contact with the imaging silver halide emulsion layer(s) during both ultrasonic and light exposures, a transport liquid which is not a developer can be in contact with the element during ultrasonic exposure and a developer associated with the element during light exposure. In either case, the advantage to be gained is the consolidation of the development processing step with the step of light exposure, thereby permitting very rapid access to a viewable image.

ULTRASONOGRAPHIC ELEMENTS AND DIFFUSIBLE IONS

The ultrasonographic elements of this invention can employ supports of the type conventionally employed in photographic elements. Typical photographic supports include polymeric film, wood fiber—e.g., paper, metallic sheet and foil, glass and ceramic supporting elements provided with one or more subbing layers to enhance the adhesive, antistatic, dimensional, abrasive, hardness, frictional and/or other properties of the support surface.

Typical of useful polymeric film supports are films of cellulose nitrate and cellulose esters such as cellulose triacetate and diacetate, polystyrene, polyamides, homo- and co-polymers of vinyl chloride, poly-(vinyl acetal), polycarbonate, homo- and co-polymers of olefins, such as polyethylene and polypropylene, and polyesters of dibasic aromatic carboxylic acids with divalent alcohols, such as poly(ethylene terephthalate).

Typical of useful paper supports are those which are partially acetylated or coated with baryta and/or a polyolefin, particularly a polymer of an α-olefin containing 2 to 10 carbon atoms, such as polyethylene, polypropylene, copolymers of ethylene and propylene and the like.

Polyolefins, such as polyethylene, polypropylene and polyallomers—e.g., copolymers of ethylene with propylene, as illustrated by Hagemeyer et al U.S. Pat. No. 3,478,128, are preferably employed as resin coatings over paper, as illustrated by Crawford et al U.S. Pat. No. 3,411,908 and Joseph et al U.S. Pat. No. 3,630,740, over polystyrene and polyester film supports, as illustrated by Crawford et al U.S. Pat. No. 3,630,742, or can be employed as unitary flexible reflection supports, as illustrated by Venor et al U.S. Pat. No. 3,973,963.

Preferred cellulose ester supports are cellulose triacetate supports, as illustrated by Fordyce et al U.S. Pat. Nos. 2,492,977, '978 and 2,739,069, as well as mixed cellulose ester supports, such as cellulose acetate propionate and cellulose acetate butyrate, as illustrated by Fordyce et al U.S. Pat. No. 2,739,070.

Preferred polyester film supports have comprised of linear polyester, such as illustrated by Alles et al U.S. Pat. No. 2,627,088, Wellman U.S. Pat. No. 2,720,503, Alles U.S. Pat. No. 2,779,684 and Kibler et al U.S. Pat. No. 2,901,466. Polyester films can be formed by varied techniques, as illustrated by Alles, cited above, Czerkas et al U.S. Pat. No. 3,663,683 and Williams et al U.S. Pat. No. 3,504,075, and modified for use as photographic film supports, as illustrated by Van Stappen U.S. Pat. No. 3,227,576, Nadeau et al U.S. Pat. No. 3,501,301, Reedy et al U.S. Pat. No. 3,589,905, Babbitt et al U.S. Pat. No. 3,850,640, Bailey et al U.S. Pat. No. 3,888,678, Hunter U.S. Pat. No. 3,904,420 and Mallinson et al U.S. Pat. No. 3,928,697.

The ultrasonographic elements can employ supports which are resistant to dimensional change at elevated temperatures. Such supports can be comprised of linear condensation polymers which have glass transition temperatures above about 190° C., preferably 220° C., such as polycarbonates, polycarboxylic esters, polyamides, polysulfonamides, polyethers, polyimides, polysulfonates and copolymer variants, as illustrated by Hamb U.S. Pat. Nos. 3,634,089 and 3,772,405; Hamb et al U.S. Pat. Nos. 3,725,070 and 3,793,249; Wilson *Research Disclosure,* Vol. 118, February 1974, Item 11833, and Vol. 120, April 1974, Item 12046; Conklin et al *Research Disclosure,* Vol. 120, April 1974, Item 12012; *Product Licensing Index,* Vol. 92, December 1971, Items 9205 and 9207; *Research Disclosure,* Vol. 101, September 1972, Items 10119 and 10148; *Research Disclosure,* Vol. 106, February 1973, Item 10613; *Research Disclosure,* Vol. 117, January 1974, Item 11709, and *Research Disclosure,* Vol. 134, June 1975, Item 13455.

In a simple form, the ultrasonographic element includes a single silver halide emulsion layer. The emulsion can be formed by dispersed silver halide grains and a conventional photographic vehicle. It is generally preferred to employ hydrophilic colloids alone or in combination with other materials as vehicles. Suitable hydrophilic materials include both naturally occurring substances such as proteins, protein derivatives, cellulose derivatives—e.g., cellulose esters, gelatin—e.g., alkali-treated gelatin (cattle bone or hide gelatin) or acid-treated gelatin (pigskin gelatin), gelatin derivatives—e.g., acetylated gelatin, phthalated gelatin and the like, polysaccharides such as dextran, gum arabic, zein, casein, pectin, collagen derivatives, collodion, agar-agar, arrowroot, albumin and the like as described in Yutzy et al U.S. Pat. Nos. 2,614,928 and '929, Lowe et al U.S. Pat. Nos. 2,691,582, 2,614,930, '931, 2,327,808 and 2,448,534, Gates et al U.S. Pat. Nos. 2,787,545 and 2,956,880, Himmelmann et al U.S. Pat. No. 3,061,436, Farrell et al U.S. Pat. No. 2,816,027, Ryan U.S. Pat. Nos. 3,132,945, 3,138,461 and 3,186,846, Dersch et al U.K. Pat. No. 1,167,159 and U.S. Pat. Nos. 2,960,405 and 3,436,220, Geary U.S. Pat. No. 3,486,896, Gazzard U.K. Pat. No. 793,549, Gates et al U.S. Pat. Nos. 2,992,213, 3,157,506, 3,184,312 and 3,539,353, Miller et al U.S. Pat. No. 3,227,571, Boyer et al U.S. Pat. No. 3,532,502, Malan U.S. Pat. No. 3,551,151, Lohmer et al U.S. Pat. No. 4,018,609, Luciani et al U.K. Pat. No. 1,186,790, U.K. Pat. No. 1,489,080 and Hori et al Belgian Pat. No. 856,631, U.K. Pat. No. 1,490,644, U.K. Pat. No. 1,483,551, Arase et al U.K. Pat. No. 1,459,906, Salo U.S. Pat. Nos. 2,110,491 and 2,311,086, Fallesen U.S. Pat. No. 2,343,650, Yutzy U.S. Pat. No. 2,322,085, Lowe U.S. Pat. No. 2,563,791, Talbot et al U.S. Pat. No. 2,725,293, Hilborn U.S. Pat. No. 2,748,022, DePauw et al U.S. Pat. No. 2,956,883, Ritchie U.K. Pat. No. 2,095, DeStubner U.S. Pat. No. 1,752,069, Sheppard et al U.S. Pat. No. 2,127,573, Lierg U.S. Pat. No. 2,256,720, Gaspar U.S. Pat. No. 2,361,936, Farmer U.K. Pat. No. 15,727, Stevens U.K. Pat. No. 1,062,116 and Yamamoto et al U.S. Pat. No. 3,923,517.

The emulsions can also contain alone or in combination with hydrophilic water permeable colloids as vehicles or vehicle extenders (e.g., in the form of latices), synthetic polymeric peptizers, carriers and/or binders such as poly(vinyl lactams), acrylamide polymers, polyvinyl alcohol and its derivatives, polyvinyl acetals, polymers of alkyl and sulfoalkyl acrylates and methacrylates, hydrolyzed polyvinyl acetates, polyamides, polyvinyl pyridine, acrylic acid polymers, maleic anhydride copolymers, polyalkylene oxides, methacrylamide copolymers, polyvinyl oxazolidinones, maleic acid copolymers, vinylamine copolymers, methacrylic acid copolymers, acryloyloxyalkylsulfonic acid copolymers, sulfoalkylacrylamide copolymers, polyalkyleneimine copolymers, polyamines, N,N-dialkylaminoalkyl acrylates, vinyl imidazole copolymers, vinyl sulfide copolymers, halogenated styrene polymers, amineacrylamide polymers, polypeptides and the like as described in Hollister et al U.S. Pat. Nos. 3,679,425, 3,706,564 and 3,813,251, Lowe U.S. Pat. Nos. 2,253,078, 2,276,322, '323, 2,281,703, 2,311,058 and 2,414,207, Lowe et al U.S. Pat. Nos. 2,484,456, 2,541,474 and 2,632,704, Perry et al U.S. Pat. No. 3,425,836, Smith et al U.S. Pat. Nos. 3,415,653 and 3,615,624, Smith U.S. Pat. No. 3,488,708, Whiteley et al U.S. Pat. Nos. 3,392,025 and 3,511,818, Fitzgerald U.S. Pat. Nos. 3,681,079, 3,721,565, 3,852,073, 3,861,918 and 3,925,083, Fitzgerald et al U.S. Pat. No. 3,879,205, Nottorf U.S. Pat. No. 3,142,568, Houck et al U.S. Pat. Nos. 3,062,674 and 3,220,844, Dann et al U.S. Pat. 2,882,161, Schupp U.S. Pat. No. 2,579,016, Weaver U.S. Pat. No. 2,829,053, Alles et al U.S. Pat. No. 2,698,240, Priest et al U.S. Pat. No.

3,003,879, Merrill et al U.S. Pat. No. 3,419,397, Stonham U.S. Pat. No. 3,284,207, Lohmer et al U.S. Pat. No. 3,167,430, Williams U.S. Pat. No. 2,957,767, Dawson et al U.S. Pat. No. 2,893,867, Smith et al U.S. Pat. Nos. 2,860,986 and 2,904,539, Ponticello et al U.S. Pat. Nos. 3,929,482 and 3,860,428, Ponticello U.S. Pat. No. 3,939,130, Dykstra U.S. Pat. No. 3,411,911 and Dykstra et al Canadian Pat. No. 774,054, Ream et al U.S. Pat. No. 3,287,289, Smith U.K. Pat. No. 1,466,600, Stevens U.K. Pat. No. 1,062,116, Fordyce U.S. Pat. No. 2,211,323, Martinez U.S. Pat. No. 2,284,877, Watkins U.S. Pat. No. 2,420,455, Jones U.S. Pat. No. 2,533,166, Bolton U.S. Pat. No. 2,495,918, Graves U.S. Pat. No. 2,289,775, Yackel U.S. Pat. No. 2,565,418, Unruh et al U.S. Pat. Nos. 2,865,893 and 2,875,059, Rees et al U.S. Pat. No. 3,536,491, Broadhead et al U.K. Pat. No. 1,348,815, Taylor et al U.S. Pat. No. 3,479,186, Merrill et al U.S. Pat. No. 3,520,857, Bacon et al U.S. Pat. No. 3,690,888, Bowman U.S. Pat. No. 3,748,143, Dickinson et al U.K. Pat. Nos. 808,227 and '228, Wood U.K. Pat. No. 822,192 and Iguchi et al U.K. Pat. No. 1,398,055.

The silver halide grains in the emulsion layer can be of any conventional type which can form a latent image predominantly on the surface of the silver halide grains or predominantly on the interior of the silver halide grains. Any photographic silver halide—e.g., silver chloride, silver iodide, silver bromide, silver bromoiodide, silver chlorobromide, silver chlorobromoiodide, etc.—can be employed. Both coarse and fine grain emulsions are useful in the practice of this process. The silver halide grains can be either monodispersed or polydispersed and can be of either regular or irregular crystal structure.

The predominantly surface latent image-forming silver halide grains, hereinafter referred to as surface latent image grains, are those most commonly employed in photographic elements and are those obtained by silver halide precipitation in the presence of a peptizer in the absence of special modifying procedures. They can be prepared by either single or double jet (including continuous) precipitation techniques well known to those skilled in the art.

These predominantly surface latent image-forming silver halide grains can be surface chemically sensitized, such as with active gelatin, as illustrated by T. H. James, *The Theory of the Photographic Process*, 4th Ed., Macmillan, 1977, pp. 67-76, or with sulfur, selenium, tellurium, gold, platinum, palladium, iridium, osmium, rhenium or phosphorus sensitizers or combinations of these sensitizers, such as at pAg levels of from 5 to 10, pH levels of from 5 to 8 and temperatures of from 30° to 80° C., as illustrated by *Research Disclosure*, Vol. 120, April 1974, Item 12008, *Research Disclosure*, Vol. 134, June 1975, Item 13452, Sheppard et al U.S. Pat. No. 1,623,499, Matthies et al U.S. Pat. No. 1,673,522, Waller et al U.S. Pat. No. 2,399,083, Damshroder et al U.S. Pat. No. 2,642,361, McVeigh U.S. Pat. No. 3,297,447, Dunn U.S. Pat. No. 3,297,446, McBride U.K. Pat. No. 1,315,755, Berry et al U.S. Pat. No. 3,772,031, Gilman et al U.S. Pat. No. 3,761,267, Ohi et al U.S. Pat. No. 3,857,711, Klinger et al U.S. Pat. No. 3,565,633, Oftedahl U.S. Pat. Nos. 3,901,714 and 3,904,415 and Simons U.K. Pat. No. 1,396,696; chemical sensitization being optionally conducted in the presence of thiocyanate derivatives, as described in Damschroder U.S. Pat. No. 2,642,361; thioether compounds, as disclosed in Lowe et al U.S. Pat. No. 2,521,926, Williams et al U.S. Pat. No. 3,021,215 and Bigelow U.S. Pat. No. 4,054,457 and azaindenes, azapyridazines and azapyrimidines, as described in Dostes U.S. Pat. No. 3,411,914, Kuwabara et al U.S. Pat. No. 3,554,757, Oguchi et al U.S. Pat. No. 3,565,631 and Oftedahl U.S. Pat. No. 3,901,714. Additionally or alternatively, the grain surfaces can be reduction sensitized—e.g., with hydrogen, as illustrated by Janusonis U.S. Pat. No. 3,891,446 and Babcock et al U.S. Pat. No. 3,984,249, by low pAg (e.g., less than 5) high pH (e.g., greater than 8) treatment or through the use of reducing agents, such as stannous chloride, thiourea dioxide, polyamines and amineboranes, as illustrated by Allen et al U.S. Pat. No. 2,983,609, Oftedahl et al *Research Disclosure*, Vol. 136, August 1975, Item 13654, Lowe et al U.S. Pat. Nos. 2,518,698 and 2,739,060, Roberts et al U.S. Pat. No. 2,743,182 and '183, Chambers et al U.S. Pat. No. 3,026,203 and Bigelow et al U.S. Pat. No. 3,361,564.

The predominantly internal latent image-forming silver halide grains, hereinafter referred to as internal latent image grains, can be prepared by either physical or chemical internal sensitization. Exemplary of patents which teach the formation of internal latent image silver halide grains, their internal and, in some instances, surface chemical sensitization are Davey and Knott, U.S. Pat. No. 2,592,250, issued May 8, 1952, Porter et al U.S. Pat. No. 3,206,313, issued Sept. 14, 1965, Porter et al U.S. Pat. No. 3,317,322, issued May 2, 1967, Motter et al U.S. Pat. No. 3,703,584, issued Nov. 21, 1972, Evans U.S. Pat. No. 3,761,276, issued Sept. 25, 1973 and Evans and Atwell U.S. Pat. No. 4,035,185, issued July 12, 1977, here incorporated by reference.

Other conventional silver halide grains responsive to photographic exposure useful in the practice of this process are disclosed in *Research Disclosure*, paragraph I, of publication 17643, cited above, here incorporated by reference.

One approach for providing initially light-desensitized emulsions for use in the various ultrasonographically negative-working embodiments of this invention described above is to employ an emulsion containing surface latent image-forming silver halide grains, as described above. However, the emulsion in which they are incorporated is modified by halide ion adjustment so that it is substantially desensitized to light exposure. That is, the pAg of the emulsion is adjusted with halide ion addition so that the maximum density obtainable by light exposure and photographic processing (without contact with the transport liquid before light exposure and without ultrasound exposure) is less than 1.0, preferably less than 0.5.

As is well understood by those skilled in the art, pAg is the negative logarithm (hereinafter designated log) of the silver ion concentration expressed in normality units (which for monovalent ions corresponds to moles/liter). The relationship of the silver ion concentration, expressed as pAg and the concentration of bromide ion, for example, in a silver bromide emulsion can be illustrated by the following equation:

$$-\log K_{sp} = pBr + pAg$$

where pAg is the negative log silver ion concentration, expressed in normality units,
pBr is the negative log bromide ion concentration, expressed in normality units, and
Ksp is the solubility product constant.

As is well appreciated in the art, Ksp values are a function of both temperature and the specific halide or mixture of halides chosen.

From the foregoing, it is apparent that to elevate the pAg of the emulsion to a substantially desensitizing level, a higher concentration of halide ions (e.g., a lower pBr) is required in the emulsion layer. The pAg of the emulsion is preferably increased by bringing the emulsion into contact with a source of halide ions, such as alkali halide solution, while the emulsion is in the form of a melt before coating. Alternatively, the pAg of the silver halide emulsion can be regulated as it is formed. pAg is a commonly employed photographic emulsion making measuring approach which provides an indirect measure of halide ion concentration. It is, of course, recognized that the presence of emulsion constituents other than halide ions can also affect silver ion concentrations. Accordingly, pAg measurements must be carefully related to the emulsions with which they are being employed. Optimum halide ion levels to desensitize an imaging silver halide emulsion layer can be established by coating otherwise comparable emulsion layers at differing halide ion adjusted pAg levels. It is, of course, within the skill of the art to measure desensitizing halide ion levels directly rather than indirectly through the measurement of pAg.

The above-described silver halide emulsions are ultrasonographically negative-working. Ultrasonic exposure of the above-described, high pAg silver halide emulsions has the effect of accelerating the release of halide ions from the surface of the silver halide grains in the pressure of a polar solvent with the result of lowering the pAg in the immediate vicinity of the silver halide grain surfaces. These grains are then no longer desensitized and will respond when subsequently exposed to light and further processed.

The corresponding ultrasonographicaly positive-working silver halide emulsions can take the form of a conventional surface latent image-forming silver halide photographic emulsion which is initially light-sensitive. In use the emulsion is brought into contact with a polar solvent containing excess halide ions in solution. For example, a silver bromide emulsion which is initially light-sensitive can be immersed in water containing a bromide salt, such as an alkali bromide, dissolved therein. In this instance imagewise exposure with ultrasonic energy accelerates diffusion of the bromide ions so that in exposed areas the pAg of the silver halide grain surface is locally raised, and the photographic sensitivity of the element is locally and imagewise decreased. The optimum level of bromide ions in the polar solvent can be readily ascertained by repeating the process using different bromide ion concentrations.

In the foregoing preferred forms of this invention, the pAg adjacent the surface of the silver halide grains is adjusted indirectly by controlling halide ion (e.g., bromide ion) diffusion either out of or into the silver halide emulsion layer. As an alternative the pAg of a silver halide emulsion layer to control its sensitivity can be adjusted using silver ions directly rather than indirectly through the use of halide ions. For example, instead of contacting a polar solvent containing bromide ions with the silver halide emulsion layer, as described above, a soluble silver salt can be incorporated in the polar solvent. In a specific, illustrative mode of practicing this process an ultrasonographically negative-working emulsion can be immersed in an aqueous solution of silver nitrate or another water soluble silver salt. Imagewise ultrasonic exposure accelerates diffusion of silver ions into the silver halide emulsion layer in the exposed regions of the layer. This lowers the pAg of the silver halide emulsion layer in an imagewise manner, thereby imagewise increasing the light sensitivity of the emulsion layer. The optimum level of silver ions in the polar solvent can be readily ascertained by repeating the process using different silver ion concentrations.

It is further recognized that ultrasonic exposure can simultaneously stimulate ionic diffusion both into and out of the silver halide emulsion layer being exposed. For example, an ultrasonographically negative-working element useful in the practice of this invention can be initially desensitized to light by providing an excess of bromide ions in the silver halide emulsion layer, as described above, and imagewise ultrasonically exposing the emulsion layer while it is in contact with a polar solvent containing silver ions dissolved therein. In this instance both bromide ion diffusion out of the emulsion layer and silver ion diffusion into the emulsion layer contribute to imagewise sensitizing the silver halide grains of the emulsion layer to light exposure. In a converse mode of practicing this process, the ultrasonographic element can be positive-working, initially containing the silver ions imbibed in the emulsion layer while the bromide ions are dissolved in the polar solvent in contact therewith. In this instance, it is silver ion diffusion out of the emulsion layer and bromide ion diffusion into the emulsion layer that relatively desensitizes the silver halide grains to light exposure.

The foregoing modes of practicing this process are described by reference to surface latent image-forming silver halide grains which are desensitized to light exposure as a function of pAg. Silver halide grains which contain an internal latent image are not developable in surface developers and therefore yield photographic responses in surface developers similar to surface latent image-forming silver halide grains which have been desensitized—that is, which contain no or few latent image centers. Conventional silver halide grains and emulsions can then be used in the foregoing modes of practicing this process which exhibit a balance of internal and surface latent image-forming efficiencies which can be shifted as a function of pAg adjustment. The references herein to silver halide grains and emulsions which have been desensitized include as a species thereof silver halide grains and emulsions which under the pAg conditions of light exposure form internal latent images, but which can form surface latent images at a different pAg.

To illustrate specifically useful embodiments of this type, what are known in the art as converted-halide type silver halide grains exhibit a balance of internal and external latent image-forming capabilities. In the form employed by Davey and Knott and Motter, cited above, the internal and external latent image-forming efficiencies of the converted-halide type silver halide grains are weighted in favor of forming an internal latent image. However, in Evans U.S. Pat. No. 3,622,318, issued Nov. 23, 1971, the converted-halide type silver halide grains are surface chemically sensitized to a degree to balance the internal and external latent image-forming efficiencies in favor of the formation of a surface latent image. In Motter, cited above, surface latent images can be similarly formed if surface chemical sensitization is undertaken to the same degree. Evans U.S. Pat. No. 3,761,276, cited above, is an illustration of internally doped and surface chemically sensitized silver halide grains exhibiting a balance of internal and surface latent image efficiencies, which under the contemplated conditions of photographic use disclosed therein, are predisposed to form an internal latent image. Evans and Atwell U.S. Pat. No. 4,035,185, cited above, illustrates a blended emulsion of the type disclosed by Evans ('276) wherein the silver halide grains are internally doped with a combination of a noble metal and a middle chalcogen sensitizer.

The photographic emulsions of Davey and Knott, Motter, Evans ('276) and Evans and Atwell are useful as ultrasonographically negative-working emulsions in the practice of this process, since they are initially incapable of forming a surface latent image when exposed to light, but can be made capable of forming a surface latent image by lowering the pAg at the silver halide grain surface. The photographic emulsions of Evans ('318) can be employed in this process as ultrasonographically positive-working emulsions, since they are initially capable of forming a surface latent image upon exposure to light, but can be converted to a form in which an internal latent image is formed by increasing the pAg adjacent the surface of the silver halide grains. It is recognized that the pAg of the photographic emulsions of these patents can be altered uniformly before ultrasonic exposure so that the negative-working emulsions are converted to positive-working emulsions and vice versa.

The term "surface developer" is used in its art recognized sense and encompasses those developers which will reveal the surface latent image on a silver halide grain, but will not reveal substantial internal latent image in an internal image-forming emulsion, and conditions generally used to develop a surface-sensitive silver halide emulsion. The surface developers can generally utilize any of the silver halide developing agents or reducing agents, but the developing bath or composition is generally substantially free of a silver halide solvent (such as water-soluble thiocyanates, water-soluble thioethers, thiosulfates, ammonia and the like) which will disrupt or dissolve the grain to reveal substantial internal image. Low amounts of excess halide are sometimes desirable in the developer or incorporated in the emulsion as halide-releasing compounds, but high amounts are generally avoided to prevent substantial disruption of the grain, especially with respect to iodide-releasing compounds.

In photographic processes for producing direct-positive images employing conventional silver halide emulsions exhibiting a balance of internal and surface latent image-forming efficiencies, the use of fogging or nucleating agents in the element or developer is common. These fogging or nucleating agents can be employed in the practice of this process, but they are not required, since the uniform light exposure step of this process simultaneously performs functions similar to both the imagewise light exposure step and the fogging or nucleating step of direct-positive photographic imaging. It is recognized, of course, that light exposure could be confined selectively to only those areas of the ultrasonographic element which are intended to form an internal latent image and, instead of light exposing areas to form a surface latent image, the direct-positive photographic nucleating procedure can be relied upon.

The patents of Davey and Knott, Motter, Evans ('276) and Evans ('318), cited above, are incorporated by reference to illustrate further details of silver halide grains and emulsions exhibiting balanced internal and surface latent image-forming efficiencies as well as the techniques for their processing and to define and illustrate the terms of art, such as "converted-halide", "surface developer", "internal latent image" and the like, which are well known and understood by those skilled in the art of photography.

Although light exposure of the silver halide emulsion layer can be confined to the portion of the spectrum to which the imaging grains possess a native sensitivity, it is contemplated to sensitize spectrally the silver halide grains so that they respond also to other portions of the electromagnetic spectrum. Spectral sensitization can be undertaken using the dyes and techniques which are conventional in preparing spectrally sensitive photographic elements.

The silver halide emulsions can be spectrally sensitized with dyes from a variety of classes, including the polymethine dye class, which includes the cyanines, merocyanines, complex cyanines and merocyanines (i.e., tri-, tetra- and poly-nuclear cyanines and merocyanines), oxonols, hemioxonols, styryls, merostyryls and streptocyanines.

The cyanine spectral sensitizing dyes include, joined by a methine linkage, two basic heterocyclic nuclei, such as those derived from quinolinium, pyridinium, isoquinolinium, 3H-indolium, benze[e]indolium, oxazolium, thiazolium, selenazolinium, imidazolium, benzoxazolinium, benzothiazolium, benzoselenazolium, benzimidazolium, naphthoxazolium, naphthothiazolium, naphthoselenazolium, thiazolinium dihydronaphthothiazolium, pyrylium and imidazopyrazinium quaternary salts.

The merocyanine spectral sensitizing dyes include, joined by a methine linkage, a basic heterocyclic nucleus of the cyanine dye type and an acidic nucleus, such as can be derived from barbituric acid, 2-thiobarbituric acid, rhodanine, hydantoin, 2-thiohydantoin, 4-thiohyantoin, 2-pyrazolin-5-one, 2-isoxazolin-5-one, indan-1,3-dione, cyclohexan-1,3-dione, 1,3-dioxan-4,6-dione, pyrazolin-3,5-dione, pentan-2,4-dione, alkylsulfonyl acetonitrile, malononitrile, isoquinolin-4-one, and chroman-2,4-dione.

Among useful spectral sensitizing dyes for sensitizing silver halide emulsions are those found in U.K. Pat. No. 742,112, Brooker U.S. Pat. Nos. 1,846,300, '301, '302, '303, '304, 2,078,233 and 2,089,729, Brooker et al U.S. Pat. Nos. 2,165,338, 2,213,238, 2,493,747, '748, 2,526,632, 2,739,964 (Reissue 24, 292) 2,778,823, 2,917,516, 3,352,857, 3,411,916 and 3,431,111, Sprague U.S. Pat. No. 2,503,776, Nys et al U.S. Pat. No. 3,282,933, Riester U.S. Pat. No. 3,660,102, Kampfer et al U.S. Pat. No. 3,660,103, Taber et al U.S. Pat. Nos. 3,335,010, 3,352,680 and 3,384,486, Lincoln et al U.S. Pat. No. 3,397,981, Fumia et al U.S. Pat. No. 3,482,978 and 3,623,881, Spence et al U.S. Pat. No. 3,718,470 and Mee U.S. Pat. No. 4,025,349. Examples of useful supersensitizing dye combinations, of nonlight-absorbing addenda which function as supersensitizers or of useful dye combinations are found in McFall et al U.S. Pat. No. 2,933,390, Jones et al U.S. Pat. No. 2,937,089, Motter U.S. Pat. No. 3,506,443 and Schwan et al U.S. Pat. No. 3,672,898.

It is known in the art that spectral sensitizing dyes in addition to extending the spectral response of the silver halide grains can have a definite desensitizing effect on the grains. The degree of desensitization exhibited is a function of parameters such as the concentration of the dye incorporated, the oxidation and reduction potentials of the dye and the pAg of the silver halide emulsion layer into which it is incorporated. By employing sensitizing dyes as desensitizers, it is possible to reduce the background or minimum densities of negative-working ultrasonographic elements, since the desensitizing action of the dye supplements the desensitization effect attributable solely to the high initial pAg of the emulsion layer. By employing desensitizers which become less effective at lower pAg's, it is possible to avoid desensitization in ultrasonically exposed areas of the ultrasonographic element. Large differences in density can be obtained between ultrasonically exposed and unexposed areas of ultrasonographically negative-working elements using selected desensitizers.

In the practice of this process any conventional silver halide emulsion desensitizer can be employed. It is preferred to employ desensitizers which exhibit a variation in densensitization as a function of pAg and, in ultrasonographically negative-working elements, it is preferred to employ desensitizers which become less effective at lowered pAg values.

Specifically preferred desensitizers are dyes such as cyanine and merocyanine dyes which exhibit a strong desensitizing effect. It is generally known, for example, that nuclei containing nitro groups cause desensitization (Glafkides, *Photographic Chemistry*, London, Fountain Press, 1960, page 921, Hamer, *Cyanine Dyes and Related Compounds*, N.Y. Interscience, 1964, page 728). Generally cyanine and merocyanine dyes containing at least one of the following nuclei are well suited for use as desensitizers: nitro-benzothiazole, 2,-aryl-1-alkylindole, pyrrolo[2,3-b]pyridine, imidazo[4,5-b]quinoxaline, carbazole, pyrazole, 5-nitro-3H-indole, 2-arylbenzindole, 2-aryl-1,8-trimethyleneindole, 2-heterocyclyindole, pyrylium, benzopyrylium, thiapyrylium, 2-amino-4-aryl-5-thiazole, 2-pyrrole, 2-(nitroaryl)indole, imidazo[1,2-a]pyridine, imidazo[2,1-b]thiazole, imidazo-[2,1-b]-1,3,4-thiadiazole, imidazo[1,2-b]pyridazine, imidazo[4,5-b]quinoxaline, pyrrolo[2,3-b]quinoxaline, pyrrolo[2,3-b]pyrazine, 1,2-diarylindole, 1-cyclohexylpyrrole and nitrobenzoselenazole. Dyes containing such nuclei are disclosed in U.S. Pat. Nos. 2,293,261, 2,930,694, 3,501,310, 3,431,111, 3,567,456, 3,592,653, 3,582,343, 3,615,639, 3,598,595, 3,598,596 and 3,598,303.

Where the dye is a merocyanine, it can contain in addition to one of the above desensitizing nuclei an acidic nucleus of the ketomethylene type. The following desensitizing acidic nuclei can be employed in merocyanine dyes: pyrido[1,2-a]pyrimidinedione, pyrimido[2,1-b]-benzothiazoledione, pyrimido[1,2-a]benzimidazoledione, tetrazolo[1,5-a]pyrimidin-7-one and quaternized 3-anilinopyrazolone, isoxazolone, pyrazolone, pyrido[1,2-]pyrimidinedione and pyrimido[2,1-b]benzothiazoledione nuclei. Merocyanine dyes containing such nuclei are disclosed in U.S. Pat. Nos. 3,598,595, 3,598,596, 3,598,603, 3,528,811, 3,579,344, 3,539,349 and 3,582,348.

Conventional desensitizers which are not dyes can also be employed, such as N,N'-dialkyl-4,4'-bis-pyridinium salts, nitron and its salts, thiuram disulfide, piazine, nitro-1,2,3-benzothiazole, nitroindazole and 5-mercaptotetrazole desensitizers. Such desensitizers and their use in silver halide emulsions are described, for example, in Peterson et al U.S. Pat. No. 2,271,229, Kendall et al U.S. Pat. No. 2,541,472, Abbott et al U.S. Pat. No. 3,295,976, Rees et al U.S. Pat. Nos. 3,184,313 and 3,403,025 and Gibbons et al U.S. Pat. No. 3,922,545.

Stated generally, it is apparent that any conventional photographic silver halide emulsion which exhibits a speed dependent on its pAg can be employed in the practice of this process. The halide ions employed for adjusting the pAg can correspond to the halides forming the silver halide grains. It is preferred to employ soluble bromide salts, such as alkali metal bromides, to raise pAg. It is preferred to employ water soluble silver salts for lowering pAg, such as silver nitrate.

While the above modes of practicing this process employ silver halide emulsions which exhibit an alteration in sensitivity as a function of pAg, it is appreciated that this process can be practiced using still other approaches to altering light sensitivity. For example, in the practice of this process any conventional photographic silver halide emulsion can be employed which is spectrally sensitized with a dye that can be protonated to a colorless form and/or deprotonated to a light-absorbing form.

In one mode of practicing this process with such a silver halide emulsion, the emulsion with the spectral sensitizing dye in its light-absorbing form incorporated is immersed in a polar solvent, such as an acid solution, which is at a sufficiently low pH to protonate and thus decolorize the dye in ultrasonically exposed areas. A process of associating the acid polar solvent with the ultrasonographic element, exposing to ultrasonic radiation and then light and subsequently processing, can then be practiced as more generally described above. During the light exposure step it is preferred to expose the element to a region of the electromagnetic spectrum where the emulsion layer lacks native sensitivity, but where substantial absorption by the unprotonated dye is observed, in order to obtain low minimum density levels. However, this is not required, since the unprotonated dye can be employed to substantially enhance light response even in the spectral region of native sensitivity. It is apparent that these silver halide emulsions are initially light responsive and then are desensitized to light as a function of ultrasonic exposure. Thus, in this form, they are ultrasonographically positive-working, as that there has been defined above.

Where the spectral sensitizing dye is of a type which can be converted from an initially colorless form to a light-absorbing form by deprotonation, it is apparent that the above-described process can be readily adapted to forming negative images. In this instance, the dye in its protonated form is incorporated in the imaging silver halide emulsion layer. The polar solvent to be associated with the element is then chosen so that it is of a higher pH than the emulsion layer so that the element when immersed in the polar solvent and ultrasonically exposed experiences a deprotonation of the dye to its chromophoric form. By practicing the process as described above, the ultrasonographic element, since it goes from an initially light-insensitive form to a light-sensitive form, is ultrasonographically negative-working, as that term has been defined above.

Exemplary of conventional spectral sensitizing dyes which are known to be protonatable to a colorless form and/or deprotonated to generate the dye chromophore are those disclosed by A. H. Herz, *Photographic Science and Engineering*, Vol. 18, No. 2, March-April 1974, pages 207 through 215 and VanLare U.S. Pat. No. 3,482,981. Preferred spectral sensitizing dyes of this type are benzimidazole carbocyanine dyes. By proper choice of nuclei substituents such dyes can be made to exhibit absorption maxima at wavelengths within the blue, green, red and infrared portions of the electromagnetic spectrum.

In addition to spectral sensitizing dyes whose effectiveness can be modified by pH, desensitizers having pH dependence are also known in the art. For example, Itoh, *J. Soc. Sci. Photo.*, Vol. 32, page 18, 1969, discloses that adenine, a known desensitizer, will adsorb to silver halide grains at a pH of 6, but not at a pH of 2. Similarly, E. J. Birr, *Z. Wiss. Phot.*, Vol. 49, page 261, 1954, Volume 50, page 107, 1955 and Volume 50, page 124, 1955, discloses the pH dependence of adsorption of tetraazindenes. E. J. Birr in his book *Stabilization of Photographic Silver Halide Emulsions*, Focal Press, 1974, page 175, discloses that the desensitizers nitrobenzimidazole, mercaptobenzimidazole, mercaptobenzimidzole sulfonic acid, benzotriazole and phenylmercaptotetrazole are selectively adsorbed by silver halide grains at higher pH.

It is apparent that the positive-working and negative-working ultrasonographic elements discussed immediately above illustrate that ultrasonic radiation can be employed to modify locally the pH of an imaging silver halide emulsion layer so that its light response is also locally modified. This ultrasonically induced modification of the element can then be used to generate a viewable ultrasonographic record. Since the component of the emulsion layer in this instance being acted upon is the sensitizer or desensitizer, it is apparent that in the practice of this form of this process any conventional photographic silver halide emulsion layer compatible with such a pH modifiable sensitizer or desensitizer can be employed.

The photographic silver halide emulsions described above as being pAg or pH modifiable in their photographic response through the use of ultrasonic radiation can, of course, contain a variety of conventional photographic siliver halide emulsion addenda. For example, any of the conventional addenda disclosed in *Research Disclosure*, Item 17643, cited above, not incompatible with obtaining the desired pAg and pH modification effects, can be used in the practice of this process.

It is specifically recognized that the ultrasonographic elements employed, particularly the silver halide emulsion layers thereof employed in imaging, can be protected against the variations of sensitivity during keeping. Useful antifoggants and stabilizers, which can be used alone or in combination include the thiazolium salts described in Brooker et al U.S. Pat. No. 2,131,038 and Allen et al U.S. Pat. No. 2,694,716; the azaindenes described in Piper U.S. Pat. No. 2,886,437 and Heimbach et al U.S. Pat. No. 2,444,605; the mercury salts as described in Allen et al U.S. Pat. No. 2,728,663; the urazoles described in Anderson et al U.S. Pat. No. 3,287,135; the sulfocatechols described in Kennard et al U.S. Pat. No. 3,236,652; the oximes described in Carroll et al British Pat. No. 623,448; nitron; nitroindazoles; the mercaptotetrazoles described in Kendall et al U.S. Pat. No. 2,403,927, Kennard et al U.S. Pat. No. 3,266,897 and Luckey et al U.S. Pat. No. 3,397,987; the polyvalent metal salts described in Jones U.S. Pat. No. 2,839,405; the thiuronium salts described in Herz U.S. Pat. No. 3,220,839 and the palladium, platinum and gold salts described in Trivelli et al U.S. Pat. No. 2,566,263 and Yutzy U.S. Pat. No. 2,597,915.

The ultrasonographic elements can contain hardeners for the hydrophilic colloid layers, as described in paragraph X *Hardeners*, plasticizers, lubricants, coating aids and matting agents, as described in paragraphs XI *Coating aids*, XII *Plasticizers and lubricants* and XVII *Matting agents, Research Disclosure*, Item 17643, cited above. Where a dye image is formed, the ultrasonographic elements can contain color image-forming materials, as described in paragraph VII *Color materials, Research Disclosure*, Item 17643.

In a simple form of the ultrasonographic element a barrier layer is in contact with the silver halide emulsion layer. The barrier layer materials are preferably chosen from among the vehicles and optionally combined vehicle extenders described above for use in the silver halide emulsion layer. The barrier layer can be varied in thickness to provide the desired migration impedance to sensitivity altering diffusible ions. Generally, however, the barrier layer is present in a thickness in the range of from about 0.2 to 5 times the thickness of the silver halide emulsion layer, which, of course, can be present in any conventional photographic silver halide emulsion layer thickness.

In addition to the silver halide emulsion layer and the barrier layer at least one source and/or receiving layer is present in the ultrasonographic element. In a preferred form the receiving and/or source layer is formed of materials chosen from among vehicle and optionally combined vehicle extender materials described above for use in the barrier and emulsion layers. In addition, in the case of a source layer, diffusible ions capable of altering the sensitivity of the silver halide emulsion layers are initially present, and, in the case of a receiving layer, a material capable of substantially immobilizing the sensitivity altering diffusible ions is incorporated.

Where the silver halide emulsion layer initially contains a diffusible ion whose emigration is accelerated by ultrasound, the ultrasonographic element contains separated from the emulsion layer by a barrier layer a sink or receiving layer capable of immobilizing the diffusible ion, thereby preventing its return to the emulsion layer. Where the silver halide emulsion is ultrasonographically negative-working by reason of containing desensitizing diffusible ions, the receiving layer contains a substance capable of receiving and immobilizing the desensitizing ions. For example, where the emulsion layer is desensitized with an excess of halide ions, the receiving layer can contain a material capable of substantially immobilizing or at least reducing the mobility of the halide ions. A material which reacts with the halide ion to form an insoluble precipitate can be employed for this purpose, such as a heavy metal salt. Alternatively, the halide ions can be immobilized by adsorption to the surface of a finely divided particulate material, such as a dispersion of carbon, an inert metal black or colloidal silver in a vehicle. It is additionally contemplated that the immobilizing material contained in the receiving layer may not initially be itself immobile. For example, a soluble silver salt, such as silver nitrate, can be initially present in the receiving layer. When halide ions and silver ions come into contact by reason of ultrasound accelerated diffusion, silver halide is formed as a precipitate. Since the silver ions are initially mobile, in this form precipitation can occur to some extent both in the barrier layer and the receiving layer. Where the silver ions actually migrate through the barrier layer to the emulsion layer under the influence of ultrasound, the silver ion containing layer acts additionally as a source layer.

In a specific preferred form of the ultrasonographic element the primary imaging layer is a silver halide emulsion layer desensitized with an excess of bromide or iodide ions, most preferably bromide ions. In this instance the emulsion layer is preferably a silver bromide, silver bromoiodide or silver chlorobromoiodide emulsion layer which, except for the desensitizing excess of bromide or iodide ions, is a conventional photographic emulsion layer. The silver iodide content, based on total silver halide, is typically maintained at 10 mole percent or less to permit achievement of maximum photographic speeds.

The receiving layer is also a silver halide emulsion layer and can contain any silver halide which is more soluble than the silver halide in the primary imaging layer. It is preferably a silver chloride emulsion layer, although minor amounts of silver bromide and/or silver iodide can be present initially also, typically less than about 10 mole percent, based on total silver halide. In other words the silver chloride emulsion layer is typically at least 90 mole percent silver chloride, based on total halide.

It is well known in the art that the native spectral sensitivity of silver halides (a) extends from shorter wavelengths to the edge of the visible spectrum in the case of silver chloride, (b) over the blue portion of the spectrum in the case of silver bromide and (c) over a still larger portion of the spectrum in the case of silver haloiodides. It is well known also that the solubility of silver chloride, though small, is higher than that of silver bromide, which is in turn higher than that of silver iodide; and, related to this, it is known that iodide ions will displace bromide from a silver bromide crystal lattice and both iodide and bromide ions displace chloride from a silver chloride crystal lattice.

Where both the primary imaging layer and the receiving layer are silver halide emulsion layers, it is apparent that the ultrasonographic element is of the type referred to above as the fifth specific form. In use the element is initially substantially nonresponsive to visible light. The primary imaging layer is nonresponsive, since it is desensitized by an excess of halide ions (halide ion adjustment of pAg) while the receiving layer is nonresponsive because of lack of native sensitivity of silver chloride to the visible spectrum. Upon placing the element in contact with a polar solvent and imagewise ultrasonically exposing, excess halide ions in the primary imaging layer selectively migrate in ultrasonically exposed areas through the barrier layer to the receiving layer. Since the excess halide ions in the primary imaging layer are bromide or iodide ions, they readily displace chloride from the silver chloride crystal lattices in the receiving layer. In this way the high chloride silver chloride emulsion in the receiving layer is converted to silver halide having a higher proportion of silver bromide and/or iodide. The additional presence of silver bromide and/or silver iodide in the receiving layer extends its native spectral sensitivity to a longer wavelength region of the spectrum. Subsequent light exposure in this longer wavelength region of the spectrum and photographic processing produces an ultrasonographic image. The ultrasonographic element exhibits both higher speed and higher image discrimination by reason of the receiving layer being present than is achieved in its absence.

The foregoing discussion of receiving layers has been directed to the receipt of diffusible ions which are desensitizing the primary imaging layer. It is appreciated that in ultrasonographically positive-working elements the receiving layer can receive diffusible ions from an emulsion layer and that the loss of these ions from the emulsion layer can have the effect of desensitizing it to light. For example, ultrasound can stimulate the diffusion of silver ions from a silver halide emulsion layer, thereby raising its pAg to a desensitizing level, particularly where a pAg responsive desensitizing dye is present in the emulsion layer. In this instance the receiving layer contains a material capable of immobilizing or substantially reducing their ability to return to the emulsion layer. In this specific form of the invention the receiving layer can take the form of a conventional receiving layer employed in silver image transfer photographic elements. Such receiving layers are disclosed, for example, in Chapter 12, "One Step Photography", *Neblette's Handbook of Photography and Reprography Materials, Processes and Systems*, 7th Ed. (1977); Chapter 16, "Diffusion Transfer and Monobaths", T. H. James, *The Theory of the Photographic Process*, 4th Ed. (1977); and Rott U.S. Pat. No. 2,352,014, Land U.S. Pat. Nos. 2,543,181 and 2,861,885, Yackel et al U.S. Pat. No. 3,020,155 and Stewart et al U.S. Pat. No. 3,769,014, the disclosures of which are here incorporated by reference.

In a preferred form the silver precipitating agents are incorporated into conventional photographic vehicles as described above and include such physical nuclei or chemical precipitants as (a) heavy metals, especially in colloidal form and salts of these metals, (b) salts, the anions of which form silver salts less soluble than the silver halide of the photographic emulsion to be processed, and (c) nondiffusible polymeric materials with functional groups capable of combining with and insolubilizing silver ions.

Typical useful silver precipitating agents include sulfides, selenides, polysulfides, polyselenides, thiourea and its derivatives, mercaptans, stannous halides, silver, gold, platinum, palladium, mercury, colloidal silver, aminoguanidine sulfate, aminoguanidine carbonate, arsenous oxide, sodium stannite, substituted hydrazines, xanthates, and the like. Polyvinyl mercaptoacetate is an example of a suitable nondiffusing polymeric silver precipitant. Heavy metal sulfides such as lead, silver, zinc, aluminum, cadmium and bismuth sulfides are useful, particularly the sulfides of lead and zinc alone or in an admixture or complex salts of these with thioacetamide, dithio-oxamide or dithio-biuret. The heavy metals and the noble metals particularly in colloidal form are especially effective. Other silver precipitating agents will occur to those skilled in the present art.

In still other embodiments of this invention the ultrasonographic element includes in addition to the silver halide emulsion layer and the barrier layer a source layer. The source layer preferably supplements the transport liquid in contact with the element as a source of diffusible ions entering the emulsion layer to either sensitize it or desensitize it. It is contemplated that in a variant form the source layer can be the only source of diffusible ions—that is, the diffusible ions need not be initially present in the transport liquid. The diffusible ions initially present in the source layers do not diffuse from these layers prior to use, since they are not mobile in the absence of a solvent. Thus, when the ultrasonographic element is brought into contact with a transport liquid so that a polar solvent is ingested, the diffusible ions become mobile. However, their rate of diffusion toward the emultion layer in the absence of ultrasound is impeded by the barrier layer. The imagewise application of ultrasound has the effect of accelerating the diffusion rate of the ions. Any of the ions taught by Rosenfeld, cited above, to be diffused into a silver halide emulsion layer by ultrasonic exposure to alter its sensitivity can be employed. For example, halide ions can be initially contained in the source layer and can be caused to diffuse into the emulsion layer to desensitize the emulsion layer by raising its pAg. Alternatively, the halide ions can convert a high chloride silver chloride emulsion to a converted-halide emulsion so that it is sensitized to at least the blue portion of the spectrum, as is apparent from the discussion relating to the use of two emulsion layers above. In still another form the source layer can contain silver ions which on diffusion into the silver halide emulsion layer lower its pAg and render it sensitive to light.

Although the foregoing discussion has been directed to embodiments in which pAg adjustment of the emulsion layer occurs as a result of ion diffusion, a number of silver halide emulsion have been discussed above whose sensitivity is altered as a function of pH adjustment. It is appreciated that in using those emulsions the source and/or receiving layers can initially contain a pH modifying material, such as an acid or alkali. To illustrate a specific form, the source layer can initially contain an acid, so that it is capable in the presence of a polar solvent of supplying protons to the emulsion layer. By incorporating in the emulsion layer a spectral sensitizing dye which is protonated to a colorless form or a desensitizer which is converted to an active form by protonation, specific examples being provided above, it is possible to alter the sensitivity of the emulsion layer. Where the transport liquid with which the ultrasonographic element is contacted is initially alkaline, such as where an alkaline photographic developer is brought into contact with the ultrasonographic element prior to ultrasonic exposure, the ultrasonographic element can contain an acid layer which is isolated from the barrier layer by a timing layer identical to conventional acid and timing layers contained in image transfer photographic elements. Ingestion of the alkaline transport liquid permits the release of the mobile protons in a timed manner following contact of the transport liquid with the ultrasonographic element. The foregoing discussion is merely illustrative. Other variant forms will occur to those skilled in the art once apprised of the foregoing discussion.

A preferred negative-working system will, in the absence of ultrasound, within a period of from 10 seconds to 10 hours following contact of the ultrasonographic element with the transport liquid produce a density of at least 0.5, preferably at least 1.0, when thereafter light exposed and photographically processed in a manner contemplated in the practice of this process. If the density is achieved in less than 10 seconds in the absence of ultrasound, reproducible imaging will be difficult without obtaining high background densities or without employing high speed transport equipment to bring the ultrasonographic element into and out of contact with the transport liquid, although this is, of course, possible. On the other hand, if a density of at least 0.5 is not obtained within 10 hours following contact of the transport liquid with the ultrasonographic element, the process will be unattractively slow when ultrasound is employed at lower power levels, such as are preferred in the practice of this invention.

Similarly, a preferred positive-working system will, in the absence of ultrasound, within a period of from 10 seconds to 10 hours of contact with the transport liquid cause the ultrasonographic element to produce a density of less than 1.0, preferably less than 0.5, when thereafter light exposed and photographically processed in a manner contemplated in the practice of this process.

An optimum imaging response for any specific system described above can be achieved by routine adjustments. For example, the rate of response of the ultrasonographic element can be generally reduced merely by overcoating the emulsion layer with a diffusion permeable layer, such as a layer formed of a photographic vehicle of the composition described above. Similarly the rate of response can be adjusted by varying the thickness of the barrier layer and/or its degree of hardening. The concentration of the diffusible ions in the transport liquid and/or source layer can be employed to alter the rate of response of the ultrasonographic element.

The foregoing discussion is considered sufficiently complete to permit those familiar with the photographic and ultrasonic arts to practice this invention. To the extent that specific details and variants of this invention are not explicitly discussed they can be appreciated by reference to the photographic and ultrasonographic arts. For example, it is contemplated that the ultrasonic exposure, development and other photographic processing steps of this process can be practiced within the temperature ranges conventionally employed in photography. The ultrasonographic elements can be varied, such as by providing multiple emulsion, barrier, source and/or receiving layers. Numerous other element features conventional in the photographic arts and not incompatible with this invention can be included in the ultrasonographic elements.

The invention is further illustrated by the following examples:

I. An ultrasonic sensitometer was employed made up of a rectangular plastic vessel open at its top and containing a water reservoir. Arranged along the bottom wall of the vessel were seven (7) ultrasonic transducers. The ultrasonic transducers each presented a circular emitting surface of 0.785 square centimeter, as viewed from above, and were arranged in a row, adjacent transducers being separated by 2.4 cm, with power levels supplied to the transducers increasing by a factor of 2 in going from one transducer to another adjacent thereto. Except for the power supplied to each transducer, they were identical. The emitting surfaces of the transducers were in contact with the water in the reservoir. The ultrasonic frequency supplied to the transducers was 5 megahertz. Each ultrasonographic element to be tested was immersed in the reservoir just beneath its surface and held spaced from the transducers by about 15.0 cm using a suitable clamp to hold the strip flat and in position. Approximately 20 cm above the mounted strip was positioned an array of 132 tungsten lamps of one and one-half watt each (commercially available under the trademark GE 31) equally spaced on a polished metal reflecting surface contained within a housing 10 by 40 cm on an edge. The ultrasonic transducers yielded a power output at the film plane of 140, 35, 8.7, 2.2, 1.0, 0.33 and 0.125 watts/cm$^2$, respectively.

II. A first ultrasonographic element (USE-1) was prepared by coating onto a polyethylene terephthalate (PETP) film support a silver chloride emulsion at a coverage of 3.2 grams per square meter of silver and 2.7 grams per square meter of gelatin. The mean grain size was 0.1. As coated the silver chloride emulsion was a photographic emulsion possessing the native sensitivity of silver chloride grains to electromagnetic radiation— that is, its sensitivity to light stopped at the edge of the visible spectrum.

The silver chloride emulsion layer was overcoated with a gelatin barrier layer at a coverage of 2.7 grams per square meter of gelatin.

The barrier layer was in turn overcoated with an ultrasonographically negative-working silver bromide emulsion layer. A cubic-grained gelatino-silver bromide emulsion free of surface chemical sensitization and having a mean grain diameter of 0.2 micron was employed. The emulsion was pAg adjusted with bromide ions so that as coated it was substantially desensitized to light exposure. The emulsion additionally included a desensitizing dye of the formula

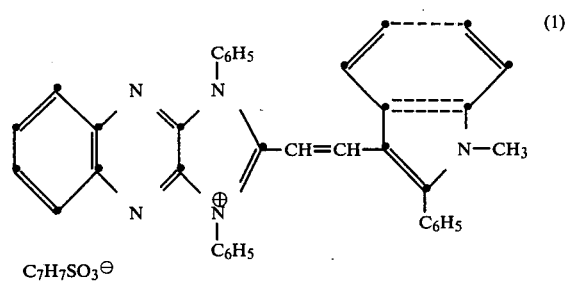

at a level of $1.0 \times 10^{-4}$ mole per mole of silver.

III. A second ultrasonographic element (USE-2) according to this invention was prepared substantially as described in paragraph II. above, but with the modification that the gelatin coverage of the barrier layer was increased to 5.4 grams per square meter.

IV. A third, control ultrasonographic element (USE-C) was prepared. The control element was identical to the element USE-1, except for the omission of the silver chloride and barrier layers. That is, the control element USE-C was identical to the element of Example 1 of Rosenfeld U.S. Ser. No. 854,556, cited above.

V. The ultrasonographic elements USE-1, USE-2 and USE-C were identically exposed and processed as follows: After immersion in the reservoir the element was ultrasonically exposed with pulsed ultrasound of a pulse width of $10^{-6}$ second, a pulse period of $10^{-4}$ and $10^5$ total pulses. Light exposure was delayed for 30 seconds after ultrasound exposure. Light exposure was for 16 seconds. Light exposure was through a Wratten 2A filter, which absorbs radiation at wavelengths shorter than 405 nm. Thus the silver chloride layer was not exposed to light within the portion of the spectrum to which it possesses native sensitivity. After light exposure the element was processed for three (3) minutes in Kodak Developer D-19, fixed, washed and dried.

Figure 2:
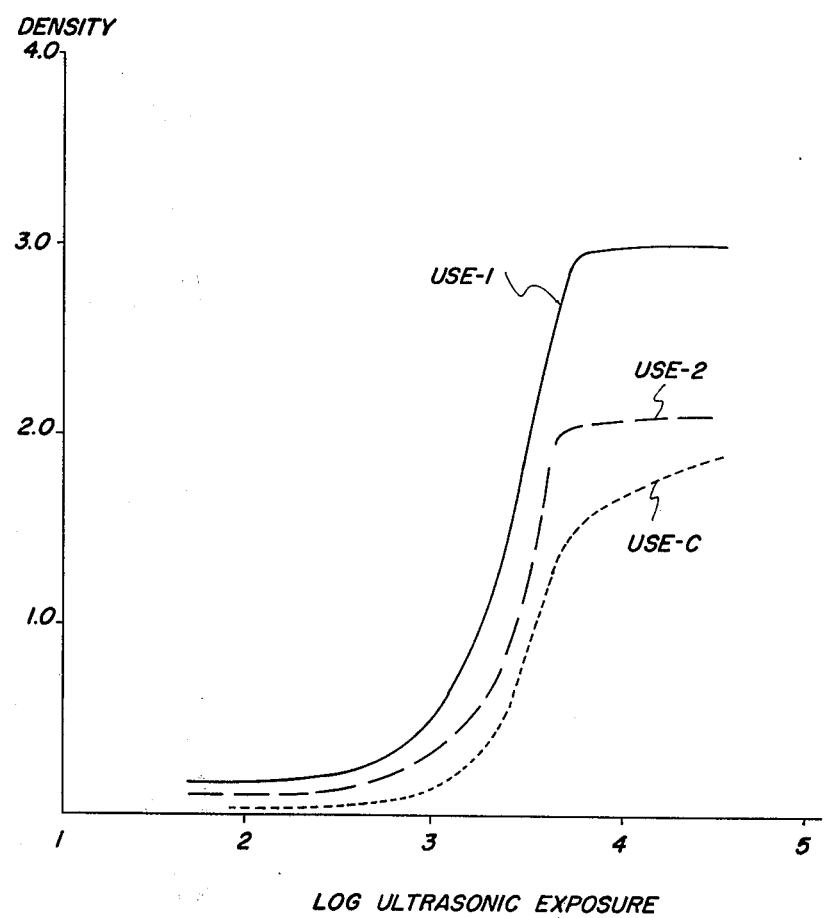

VI. An ultrasonographic characteristic curve was obtained for each element by plotting maximum density obtained in each exposure area aginst the log of ultrasonic exposure given that area. In FIG. 2 it can be seen that USE-1 produced a maximum density of 3.0 and further was more responsive than USE-2 or USE-C. USE-2 produced a maximum density in excess of 2.0 and was more responsive to ultrasound than USE-C. The curves in FIG. 2 clearly illustrate an improvement in both ultrasonic sensitivity and image discrimination for the ultrasonographic elements of this invention as compared to Rosenfeld Example 1 (USE-C) ultrasonographic element.

The invention has been described in detail with particular reference to preferred embodiments thereof but it will be understood that variations and modifications can be effected within the spirit and scope of the invention.

What is claimed is:

1. In an ultrasonographic element comprising
   a support and
   a silver halide emulsion layer containing a diffusible densensitizer in an amount sufficient to suppress the response of said emulsion layer to electromagnetic radiation, so that upon imagewise ultrasonic exposure of said ultrasonographic element while in contact with a transport liquid accelerated diffusion of said desensitizer from said emulsion layer occurs in ultrasonically exposed areas, thereby permitting an ultrasonographic image to be formed by exposure to electromagnetic radiation and photographic processing,
   the improvement comprising
      a second layer capable of receiving and immobilizing said desensitizer and
      barrier means interposed between said emulsion layer and said second layer for impeding diffusion of said desensitizer in the absence of ultrasound while permitting diffusion of said desensitizer in the presence of ultrasound.

2. In an ultrasonographic element comprising
   a support and
   a silver halide emulsion layer containing halide ions in an amount sufficient to suppress the response of said emulsion layer to electromagnetic radiation, so that upon imagewise ultrasonic exposure of said ultrasonographic element while in contact with a transport liquid accelerated diffusion of said halide ions from said emulsion layer occurs in ultrasonically exposed areas, thereby permitting an ultrasonographic image to be formed by exposure to electromagnetic radiation and photographic processing,
   the improvement comprising
      a second layer interposed between said support and said emulsion layer capable of receiving and immobilizing said halide ions and
      barrier means interposed between said emulsion layer and said second layer for impeding diffusion of said halide ions in the absence of ultrasound while permitting diffusion of said halide ions in the presence of ultrasound, thereby enhancing the response of said element to electromagnetic radiation in ultrasonically exposed areas.

3. In an ultrasonographic element according to claim 2 the further improvement in which said halide ions comprise bromide ions and said second layer comprises a silver halide emulsion which is at least 90 mole percent silver chloride, based on total silver halide present in said second layer.

4. In an ultrasonographic element comprising
   a support and
   a silver halide emulsion layer of initially limited sensitivity to electromagnetic radiation, so that upon imagewise ultrasonic exposure of said ultrasonographic element while in contact with a transport liquid and a diffusible sensitizer accelerated diffusion of the sensitizer into said emulsion layer occurs in ultrasonically exposed areas, thereby permitting an ultrasonographic image to be formed by exposure to electromagnetic radiation and photographic processing, the improvement comprising
said silver halide emulsion layer containing a spectral sensitizing dye which is initially protonated to an inactive form,
a second layer containing diffusible sensitizer in an amount sufficient to increase the sensitivity of said silver halide emulsion layer to electromagnetic radiation and
barrier means interposed between said emulsion layer and said second layer for impeding diffusion of said sensitizer in the absence of ultrasound while permitting diffusion of said sensitizer in the presence of ultrasound.

5. In an ultrasonographic element comprising
a support and
a silver halide emulsion layer containing halide ions in an amount sufficient to suppress the response of said emulsion layer to electromagnetic radiation, so that upon imagewise ultrasonic exposure of said ultrasonographic element while in contact with a transport liquid accelerated diffusion of said halide ions from said emulsion layer occurs in ultrasonically exposed areas, thereby permitting an ultrasonographic image to be formed by exposure to electromagnetic radiation and photographic processing,
the improvement comprising
a second layer interposed between said support and said emulsion layer containing silver ions in an amount sufficient to immobilize said halide ions and
barrier means interposed between said emulsion layer and said second layer for impeding diffusion of said halide ions and said silver ions in the absence of ultrasound while permitting diffusion of at least said halide ions in the presence of ultrasound.

6. In an ultrasonographic element according to claim 1, 2, 3, 4, or 5 the further improvement in which said barrier means is comprised of a hydrophilic colloid layer.

7. In an ultrasonographic element according to claim 6 the further improvement in which said barrier means is a gelatinous layer.

8. In an ultrasonographic element according to claim 1, 2, 3, or 5 the further improvement wherein said emulsion layer contains a methine dye.

9. In an ultrasonographic element according to claim 8 the further improvement in which said methine dye is capable of desensitizing said silver halide emulsion layer to a decreasing degree as the pAg of said emulsion layer is lowered.

10. In a process of producing an ultrasonographic image employing an element having a support and a silver halide emulsion layer containing a diffusible desensitizer in an amount sufficient to suppress the response of said emulsion layer to electromagnetic radiation comprising
contacting the element with a transport liquid,
exposing the element to ultrasound in an image pattern to accelerate diffusion of the desensitizer,
exposing the element to electromagnetic radiation, and
photographically processing the element to produce an image corresponding to the image pattern of ultrasonic exposure,
the improvement comprising
diffusing the desensitizer in ultrasonically exposed areas through barrier means for impeding diffusion of the desensitizer in the absence of ultrasound and
receiving and immobilizing the desensitizer in a second layer separated from the emulsion layer by the barrier means.

11. In a process of producing an ultrasonographic image employing an element having a support and a silver halide emulsion layer containing halide ions in an amount sufficient to suppress the response of said emulsion layer to electromagnetic radiation comprising
contacting the element with a transport liquid,
exposing the element to ultrasound in an image pattern to accelerate diffusion of the halide ions,
exposing the element to electromagnetic radiation, and
photographically processing the element to produce an image corresponding to the image pattern of ultrasonic exposure,
the improvement comprising
diffusing the halide ions in ultrasonically exposed areas through barrier means for impeding diffusion of the halide ions in the absence of ultrasound and
receiving and immobilizing the halide ions in a second layer separated from the emulsion layer by the barrier means and interposed between the emulsion layer and the support.

12. In a process of producing an ultrasonographic image employing an element having a support and a silver halide emulsion layer containing bromde ions in an amount sufficient to suppress the response of said emulsion layer to electromagnetic radiation comprising
contacting the element with a transport liquid,
exposing the element to ultrasound in an image pattern to accelerate diffusion of the bromide ions,
exposing the element to ultrasound in an image pattern to accelerate diffusion of the bromide ions,
exposing the element to electromagnetic radiation, and
photographically processing the element to produce an image corresponding to the image pattern of ultrasonic exposure,
the improvement comprising
diffusing the bromide ions in ultrasonically exposed areas through barrier means for impeding diffusion of the desensitizer in the absence of ultrasound and
receiving the bromide ions at a second layer comprising a silver halide emulsion layer which is at least 90 mole percent silver chloride, based on total silver halide present in the second layer.

13. In a process of producing an ultrasonographic image employing an element having a support and a silver halide emulsion layer initially responsive to electromagnetic radiation comprising
contacting the element with a transport liquid in the presence of a diffusible desensitizer,
exposing the element to ultrasound in an image pattern to accelerate diffusion of the desensitizer,
exposing the element to electromagnetic radiation, and
photographicaly processing the element to produce an image corresponding to the image pattern of ultrasonic exposure,
the improvement comprising diffusing the desensitizer in ultrasonically exposed areas from a second layer separated from the emulsion layer by barrier means for impeding diffusion of the desensitizer in the absence of ultrasound while permitting diffusion of the desensitizer in the presence of ultrasound.

14. In a process according to claim 13 the further improvement in which halide ions are diffused during ultrasonic exposure from the second layer through the barrier means to the silver halide emulsion layer in an amount sufficient to desensitize the silver halide emulsion layer.

15. In a process of producing an ultrasonographic image employing an element having a support and a silver halide emulsion layer of initially limited sensitivity to electromagnetic radiation comprising contacting the element with a transport liquid in the presence of a diffusible sensitizer, exposing the element to ultrasound in an image pattern to accelerate diffusion of the sensitizer, exposing the element to electromagnetic radiation, and photographically processing the element to produce an image corresponding to the image pattern of ultrasonic exposure, the improvement comprising diffusing the sensitizer in ultrasonically exposed areas from a second layer separated from the emulsion layer by barrier means for impeding diffusion of the sensitizer in the absence of ultrasound while permitting diffusion of the sensitizer in the presence of ultrasound.

16. In a process of producing an ultrasonographic image employing an element having a support and a silver halide emulsion layer containing a methine dye capable of desensitizing the emulsion layer to an increasing degree as the pAg of the emulsion layer is increased and bromide ions in an amount sufficient to increase the pAg to a level substantially desensitizing the emulsion layer to light comprising contacting the element with an aqueous transport liquid, exposing the element to ultrasound of less than 100 watt-seconds per square centimeter to accelerate diffusion of the halide ions, exposing the element to light, and photographically processing the element to produce an image corresponding to the image pattern of ultrasonic exposure, the improvement comprisng diffusing the bromide ions from the silver halide emulsion layer through a hydrophilic colloid layer to a second layer interposed between the emulsion layer and the support for receiving and immobilizing the halide ions.

* * * * *